(12) United States Patent
Chen et al.

(10) Patent No.: US 11,762,193 B2
(45) Date of Patent: Sep. 19, 2023

(54) OPTICAL TRACKING SYSTEM

(71) Applicant: Apple Inc., Cupertino, CA (US)

(72) Inventors: Tong Chen, Cupertino, CA (US); Wenrui Cai, San Jose, CA (US); Mark T. Winkler, San Jose, CA (US)

(73) Assignee: Apple Inc., Cupertino, CA (US)

( * ) Notice: Subject to any disclaimer, the term of this patent is extended or adjusted under 35 U.S.C. 154(b) by 884 days.

(21) Appl. No.: 16/538,702

(22) Filed: Aug. 12, 2019

(65) Prior Publication Data

US 2020/0057147 A1 Feb. 20, 2020

Related U.S. Application Data

(60) Provisional application No. 62/765,118, filed on Aug. 17, 2018.

(51) Int. Cl.
*G02B 26/10* (2006.01)
*G02B 26/08* (2006.01)
(Continued)

(52) U.S. Cl.
CPC ......... *G02B 26/10* (2013.01); *G02B 19/0052* (2013.01); *G02B 19/0071* (2013.01);
(Continued)

(58) Field of Classification Search
CPC .......... G01S 5/163; G01S 5/16; G01S 7/4817; G01S 7/4815; G01S 7/484; G01S 7/486; G01S 7/4865; G01S 7/42; G01S 17/89; G01S 17/42; G01S 17/04; G01S 17/66; G01S 17/06; G01S 17/02; G01S 7/4863; G01S 7/4814; G02B 26/10; G02B 26/105; G02B 19/0071; G02B 19/0028; G02B 19/0066; G02B 19/0061; G02B 19/0014;
(Continued)

(56) References Cited

U.S. PATENT DOCUMENTS

| 5,808,760 A | 9/1998 | Gfeller |
| 7,609,972 B2 | 10/2009 | Cunningham |

(Continued)

FOREIGN PATENT DOCUMENTS

| CN | 103986502 | 8/2014 |
| CN | 105122687 | 12/2015 |

(Continued)

OTHER PUBLICATIONS

U.S. Appl. No. 16/554,450, filed Aug. 28, 2019, Chen et al.

*Primary Examiner* — Xuemei Zheng
(74) *Attorney, Agent, or Firm* — Brownstein Hyatt Farber Schreck, LLP

(57) ABSTRACT

An electronic device includes an electromagnetic radiation source having an axis, a set of optics disposed about the axis, a reflector disposed about the axis non-symmetrically, and a controller configured to operate the electromagnetic radiation source while controlling a beam steering orientation (e.g., rotation) of the reflector. The reflector is disposed to reflect electromagnetic radiation emitted by the electromagnetic radiation source. The set of optics is disposed to shape electromagnetic radiation emitted by the electromagnetic radiation source and direct electromagnetic radiation received from the reflector into a panoramic field of view about the axis.

20 Claims, 19 Drawing Sheets

(51) Int. Cl.
*G02B 19/00* (2006.01)
*G01S 7/481* (2006.01)
*G01S 17/42* (2006.01)

(52) U.S. Cl.
CPC ....... *G02B 26/0816* (2013.01); *G02B 26/105* (2013.01); *G01S 7/4817* (2013.01); *G01S 17/42* (2013.01)

(58) Field of Classification Search
CPC ............ G02B 19/0023; G02B 26/0816; G02B 19/0085; G02B 19/008
See application file for complete search history.

(56) References Cited

U.S. PATENT DOCUMENTS

| | | | |
|---|---|---|---|
| 7,715,723 B2 | 5/2010 | Kagawa et al. | |
| 7,830,575 B2 | 11/2010 | Moon et al. | |
| 8,251,517 B2 | 8/2012 | Gibson et al. | |
| 8,391,719 B2 | 3/2013 | Alameh | |
| 8,531,650 B2 | 9/2013 | Feldkhun et al. | |
| 8,588,805 B2 | 11/2013 | Besoll et al. | |
| 9,485,745 B2 | 11/2016 | Kurby et al. | |
| 9,489,670 B2 | 11/2016 | McGill | |
| 9,594,152 B2 | 3/2017 | Ryan et al. | |
| 9,742,492 B2 | 8/2017 | Shatz et al. | |
| 9,825,425 B2 | 11/2017 | Mor | |
| 10,043,282 B2 | 8/2018 | Smits | |
| 10,148,056 B2 | 12/2018 | Uyeno et al. | |
| 10,523,318 B2 | 12/2019 | Chen et al. | |
| 2011/0052195 A1 | 3/2011 | Karstens | |
| 2013/0010279 A1* | 1/2013 | Aiko | G01S 7/481 359/726 |
| 2015/0172878 A1 | 6/2015 | Luna | |
| 2015/0270900 A1 | 9/2015 | Hilario et al. | |
| 2017/0244490 A1 | 8/2017 | Hallal et al. | |
| 2017/0374244 A1 | 12/2017 | Swaminathan et al. | |
| 2018/0059221 A1* | 3/2018 | Slobodyanyuk | G01S 7/4814 |
| 2019/0034043 A1 | 1/2019 | Zolotykh et al. | |
| 2020/0103527 A1 | 4/2020 | Chen et al. | |
| 2021/0026013 A1* | 1/2021 | Beuschel | G01S 7/4876 |

FOREIGN PATENT DOCUMENTS

DE 102017125686 A1 * 5/2019
WO WO 17/200948 11/2017

* cited by examiner

OPTICAL TRACKING SYSTEM

CROSS-REFERENCE TO RELATED APPLICATION

This application is a nonprovisional of and claims the benefit under 35 U.S.C. § 119(e) of U.S. Provisional Patent Application No. 62/765,118, filed Aug. 17, 2018, entitled "Optical Tracking System," the contents of which are incorporated herein by reference as if fully disclosed herein.

FIELD

The described embodiments relate generally to optical tracking. More particularly, the described embodiments relate to electronic devices (e.g., a panoramic optical scanner and an optical tracker) capable of optically determining ranging and/or relative posing information for the devices.

BACKGROUND

There are scenarios in which it is desirable to determine ranging information (i.e., relative locations and distance between) and/or relative posing information (i.e., relative locations and orientations) for a pair of devices. For example, when playing an augmented reality (AR), virtual reality (VR), or mixed reality (MR) game, it may be desirable to determine a range or posing of a game controller with respect to a game console. In some cases, it may be desirable to determine ranges or posings of multiple game controllers, goggles, and so on with respect to the game console, and to determine ranges or posings of the game controllers with respect to each other. As another example, it may be desirable to determine ranging and/or relative posing information for devices that engage in line-of-sight optical communication (e.g., in a room or around a conference table).

SUMMARY

Embodiments of the systems, devices, methods, and apparatus described in the present disclosure are directed to optical tracking. In accordance with described techniques, a panoramic optical scanner may be constructed with fewer and/or lighter weight moving parts. A panoramic optical scanner may also be constructed with components disposed along and about a single axis, with the components being disposed to receive, direct, or steer electromagnetic radiation (e.g., visible or invisible (e.g., infrared (IR)) light) along, about, or outward from the single axis.

Panoramic optical scanners described in the present disclosure may direct electromagnetic radiation having a set of electromagnetic radiation edges into a panoramic field of view. For example, a panoramic optical scanner may direct ring-shaped electromagnetic radiation to one side of an axis, and sweep the ring-shaped electromagnetic radiation about the axis. The ring-shaped electromagnetic radiation may define leading and trailing edges of electromagnetic radiation, with each of the edges being a portion of the ring, and with the portions (edges) being defined by a rotational direction in which the ring is swept. As another example, a panoramic optical scanner may direct ring-shaped electromagnetic radiation about an axis, and may sweep the electromagnetic radiation in a manner that makes the ring appear to wobble about the axis. In each of these examples, an electromagnetic radiation source may be oriented to emit electromagnetic radiation along or about the axis from which electromagnetic radiation is projected outward into a panoramic field of view.

An optical tracker may be provided with a set of multiple photodetectors capable of detecting the electromagnetic radiation edges emitted by a panoramic optical scanner, and may identify timings of the edges and relate the timings to a timing reference of the panoramic optical scanner. The timing reference may correspond to a predetermined position of an electromagnetic radiation steering element (e.g., a reflector or other optical component) of the panoramic optical scanner, and may be broadcast by the panoramic optical scanner apart from, or as part of, the electromagnetic radiation edges that the panoramic optical scanner directs into a panoramic field of view.

In a first aspect, the present disclosure describes a panoramic optical scanner. The panoramic optical scanner includes a light source configured to emit light along an axis, a light directing module disposed about the axis and configured to receive and direct the light emitted by the light source, and a light steering assembly disposed about the axis and configured to steer light received from the light directing module non-symmetrically about the axis (and toward the light directing module). Light received at the light directing module, from the light steering assembly, is directed into a panoramic field of view about the axis.

In another aspect, the present disclosure describes an electronic device. The electronic device includes an electromagnetic radiation source having an axis, a set of optics disposed about the axis, a reflector disposed about the axis non-symmetrically, and a controller configured to operate the electromagnetic radiation source while controlling a beam steering orientation of the reflector. The reflector is disposed to reflect electromagnetic radiation emitted by the electromagnetic radiation source. The set of optics is disposed to shape electromagnetic radiation emitted by the electromagnetic radiation source and direct electromagnetic radiation received from the reflector into a panoramic field of view about the axis.

In still another aspect of the disclosure, another electronic device is described. The electronic device includes a set of multiple photodetectors and a controller. Each photodetector has a fixed spatial and orientation relationship with respect to other photodetectors in the set of multiple photodetectors. The controller is operable to collect charge at each photodetector during each of multiple charge integration periods; identify, per photodetector and from the collected charges, a first timing of a first edge of electromagnetic radiation and a second timing of a second edge of electromagnetic radiation; and relate the first and second timings identified per photodetector to a timing reference of a panoramic optical scanner that emits the electromagnetic radiation.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
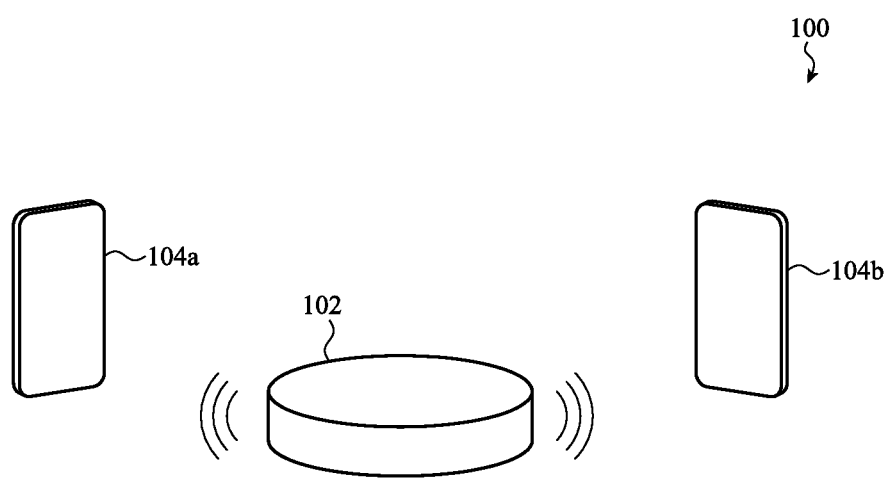
FIG. 1 shows an example environment in which a panoramic optical scanner and one or more optical trackers may be used.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following disclosure relates to optical tracking. In particular, and in some embodiments, a panoramic optical scanner capable of emitting a temporal-spatial encoded pattern of electromagnetic radiation, such as a ring, oval, cycloid curve, or other pattern of electromagnetic radiation, is described. In some embodiments, the described panoramic optical scanners may provide a 360 degree panoramic field of view, and an optical tracker may have photodetectors disposed over multiple surfaces thereof so that the optical tracker may detect electromagnetic radiation emitted by the panoramic optical scanner regardless of its posing with respect to the panoramic optical scanner.

In some cases, a panoramic optical scanner constructed in accordance with described techniques may be constructed with fewer and/or lighter weight moving parts, with a lightweight reflective surface of a microelectromechanical system (MEMS) being the only moving part in some embodiments. In some cases, the panoramic optical scanning functionality may be performed by a non-traditional moving part, such as an electrically-driven liquid or a liquid crystal beam-shaping component, or by a strictly non-moving part (e.g., an optical phase array, an electro-optical modulator, or an acoustic-optical modulator).

A panoramic optical scanner may also be constructed with components disposed along and about a single axis, with the components being disposed to receive, direct, or steer visible or invisible electromagnetic radiation (such as visible or infrared light, or other electromagnetic wavelengths) along, about, or outward from the single axis. Many conventional optical scanners position components along various axes, or require the rotation of many components having considerable weight.

Panoramic optical scanners described in the present disclosure may direct electromagnetic radiation having a set of electromagnetic radiation edges into a panoramic field of view. For example, a panoramic optical scanner may direct ring-shaped electromagnetic radiation to one side of an axis, and sweep the ring-shaped electromagnetic radiation about the axis. The ring-shaped electromagnetic radiation may define leading and trailing edges of electromagnetic radiation, with each of the edges being a portion of the ring, and with the portions (edges) being defined by a rotational direction in which the ring is swept. As another example, a panoramic optical scanner may direct ring-shaped electromagnetic radiation about an axis, and may sweep the electromagnetic radiation in a manner that makes the ring appear to wobble about the axis. In each of these examples, an electromagnetic radiation source may be oriented to emit electromagnetic radiation along or about the axis from which electromagnetic radiation is projected outward into a panoramic field of view.

An optical tracker may be provided with a set of multiple photodetectors capable of detecting the electromagnetic radiation edges emitted by a panoramic optical scanner, and may identify timings of the edges and relate the timings to a timing reference of the panoramic optical scanner. The timing reference may correspond to a predetermined position of a light steering element (e.g., a reflector or other optical component) of the panoramic optical scanner, and may be broadcast by the panoramic optical scanner apart from, or as part of, the electromagnetic radiation edges that the panoramic optical scanner directs into a panoramic field of view. Alternatively or additionally, a timing reference may be communicated over one or more non-optical channels. For example, a timing reference may be communicated over one or more radio frequency (RF) channels between a panoramic optical scanner and one or more optical trackers.

These and other embodiments are discussed with reference to FIGS. 1-17. However, those skilled in the art will readily appreciate that the detailed description given herein with respect to these figures is for explanatory purposes only and should not be construed as limiting.

FIG. 1 shows an example environment 100 in which a panoramic optical scanner and one or more optical trackers may be used. As shown, the environment 100 includes a stationary electronic device (e.g., a hub 102) and a number of mobile electronic devices (e.g., a first smartphone 104a and a second smartphone 104b). The hub 102 may include a panoramic optical scanner, and each of the smartphones 104a, 104b may include an optical tracker (or vice versa).

The panoramic optical scanner included in the hub 102 may include an electromagnetic radiation source and means (e.g., a light directing module or set of optics, and a light steering assembly including an optical component such as a reflector) to direct a pattern of electromagnetic radiation defining one or more electromagnetic radiation edges into a panoramic field of view. Each smartphone 104a, 104b may detect the electromagnetic radiation edges emitted by the panoramic optical scanner, determine a timing reference for the panoramic optical scanner, and determine a range or posing of its optical tracker with respect to a location or posing of the panoramic optical scanner included in the hub 102. The smartphone 104a or 104b may then transmit its determined range or posing to the hub 102. Alternatively, the smartphone 104a or 104b (or its user) may decide to keep its determined range or posing confidential. For example, the smartphone 104a or 104b may operate in a stealth mode. The smartphone 104a or 104b (or its user) may also decide to share its range or posing only with entities other than the panoramic optical scanner. For example, the smartphone 104a may share its range or posing with the smartphone 104b or a private group of devices including the smartphone 104b or other devices. In these latter alternatives, the panoramic optical scanner may operate as a public lighthouse service and not attempt to obtain private information from its customers (e.g., from devices including optical trackers, such as the smartphones 104a and 104b).

In a further alternative, each smartphone 104a, 104b may transmit information to the hub 102 that enables the hub 102 to determine a range or posing of the optical tracker included in the smartphone 104a or 104b with respect to a location or posing of the panoramic optical scanner included in the hub 102. After determining the ranges or relative posings of the smartphones 104a, 104b, the hub 102 may optically transmit only in the directions of the smartphones 104a, 104b, and may conserve power by not transmitting in other directions. The hub 102 may also or alternatively vary its transmit power based on the distances of the smartphones 104a, 104b from the hub 102. Similarly, the smartphones 104a, 104b may only transmit in the direction of the hub 102, or may vary their transmit powers based on their distances from the hub 102. Periodically or responsive to a trigger (e.g., in response to deteriorating or lost optical communication with one of the smartphones 104a, 104b), or responsive to a request by one of the smartphones 104a, 104b, the hub 102 may optically transmit in all directions or at a maximum transmit power. Optically transmitting over its full panoramic field of view or maximum transmit power may enable the same or new devices to detect the hub 102 and determine a range or posing with respect to the hub 102.

A panoramic optical scanner may include an electromagnetic radiation source (e.g., a visible or invisible (e.g., IR) light source), and means (e.g., a light directing module or set of optics, and a light steering assembly including an optical component such as a reflector) to direct a pattern of electromagnetic radiation defining one or more electromagnetic radiation edges into a panoramic field of view.

Each optical tracker may include a set of multiple photodetectors (e.g., a set of photodiodes), with each photodetector having a fixed spatial and orientation relationship with respect to other photodetectors in the set of multiple photodetectors. In some embodiments, a tracking circuit of an optical tracker may include a photodetector, a transimpedance amplifier (TIA) based front end circuit, and a timing channel in a controller. The TIA may convert photocurrent from a photodetector into a voltage in real time (with certain spectral filtering and latency). The converted voltage may then be thresholded/binarized (with a static or dynamic threshold) by a comparator. The resulting digital pulsing signal may be fed into a timer running at an integer multiple of a controller clock. A timing stamp may be generated by the timer for a particular electromagnetic radiation edge and compared with a timing reference stamp to derive a scanning position (e.g., a scanner-to-tracker orientation). The controller may relate timings of the edges to a timing reference of a panoramic optical scanner that emits a pattern of electromagnetic radiation including the edges. In some cases, the timing reference may be received by the optical tracker as an optical trigger (e.g., as an optical timing pulse or flash) emitted by the panoramic optical scanner in synchronization with a periodic repetition of the electromagnetic radiation pattern. In some cases, the timing reference may be encoded within the pattern of electromagnetic radiation.

Information such as the relationships between the edge timings identified by an optical tracker, fixed spatial and orientation relationships between the locations of the photodetectors that sense the edges, and a known posing of the panoramic optical scanner that emitted a pattern of electromagnetic radiation including the edges, may be used to determine a range or posing of the optical tracker in relation to a location or posing of the panoramic optical scanner. The range or posing of the optical tracker in relation to the location or posing of the panoramic optical scanner may be determined by a device that includes the optical tracker (in which case a device including the panoramic optical scanner may transmit an indication of the scanner's location or posing to the device including the optical tracker) or by the device that includes the panoramic optical scanner (in which case the device including the optical tracker may transmit an indication of its determined edge timings and photodetector positions to the device including the panoramic optical scanner). In other embodiments, both the device that includes the panoramic optical scanner and the device that includes the optical tracker may transmit information to a third device that determines the range or posing of the optical tracker in relation to the location or posing of the panoramic optical scanner.

Another environment in which a panoramic optical scanner and one or more optical trackers may be used is an AR, VR, or MR game, in which each participant may wear a pair of goggles and hold a number of game controllers (e.g., one or more of game controllers). By way of example, each game controller may have a circular sensing component coupled to a handle, and each participant may hold a game controller in each hand. Alternatively, each participant may hold or otherwise be associated with no, one, or multiple game controllers, and different participants may be associated with different numbers of game controllers. Alternatively, a participant may not wear a set of goggles and instead just hold or manipulate one or more game controllers. In some embodiments, a game controller may have an alternate configuration or shape. For example, a game controller may be shaped like a particular item it represents, such as a weapon, a glove, or a steering wheel. Also, some game controllers may be held by two or more participants at once, or may be items that are worn by, sat on, stood on, or ridden by a participant.

The game played by the participants may be hosted by a game console or other device, within or remote from the environment in which the game is played. By way of example, a game console may sit on a table within a room in which the participants are playing. In some embodiments, the game console may wirelessly serve game video to goggles worn by the participants, or the game console may serve game video over a wireless network to which the game console or goggles are connected. Audio for the game may be served in the same manner, or provided via a speaker of the game console, or broadcast from wired or wireless speakers connected to the game console or a wireless network. In some embodiments, the game console may be a device that performs other functions. For example, the game console may also function as one or more of a stereo receiver, a computer, a personal assistant, a security system, and so on.

While the game is played, the game may need to determine posings (positions and orientations) of the goggles, the game controllers, and/or the game console with respect to each other (i.e., relative posings). The posings may enable these items (or virtual representations thereof) to be posed or manipulated within an AR, VR, or MR game environment, or may enable scenes, structures, things, persons, animals, and so on to be rendered in relation to the posings of the goggles, game controllers, and/or game console.

In some embodiments, the relative posings of the goggles, game controllers, and/or game console, with respect to each other, may be determined by operation of a panoramic optical scanner included in the game console and optical trackers included in each of the goggles and game controllers. In other embodiments, the posings of the goggles, game controllers, and/or game console may be determined by operation of a panoramic optical scanner included in one or more of the goggles or game controllers, and optical trackers in the remaining devices. Typically, the effects of including a panoramic optical scanner or optical tracker in a mobile device can be ignored when determining relative posings of the devices, given that the speed of optical communication between mobile devices (or a mobile device and a stationary device) at close range is many orders of magnitude greater than the speeds at which mobile devices may be humanly moved.

In some embodiments, a panoramic optical scanner may have a panoramic field of view of 360 degrees, 270 degrees, or some other angular extent. For example, a panoramic optical scanner incorporated into the top of the game console may have a 360 degree panoramic field of view, whereas a set of goggles may incorporate a panoramic optical scanner into each temple portion of the goggles, with each panoramic optical scanner having a 270 degree panoramic field of view that overlaps the 270 degree panoramic field of the other panoramic optical scanner.

Figure 2:
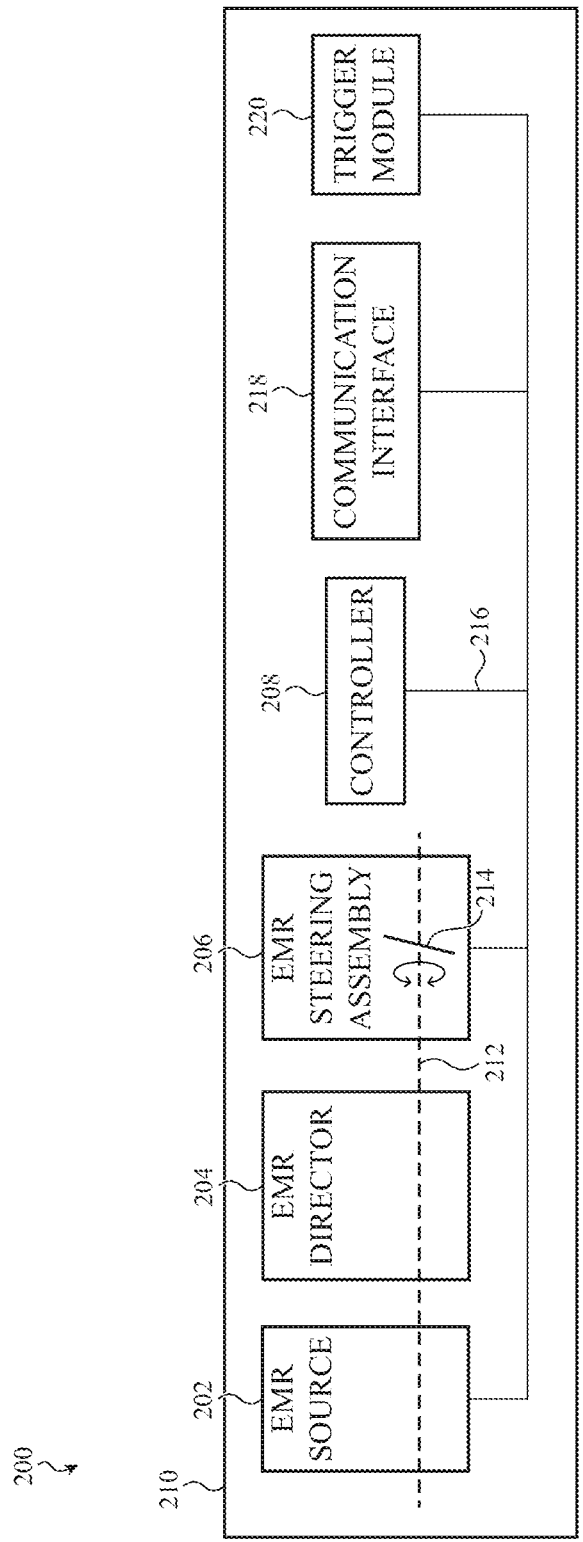
FIG. 2 shows an example block diagram of a panoramic optical scanner.

FIG. 2 shows an example block diagram of a panoramic optical scanner 200. The panoramic optical scanner 200 may include an electromagnetic radiation (EMR) source 202 (e.g., a light source including one or multiple emitters), one or multiple electromagnetic radiation directors such as electromagnetic radiation director 204 (e.g., a light directing module or set of optics), one or multiple electromagnetic radiation steering assemblies such as electromagnetic radiation steering assembly 206 (e.g., a light steering assembly), and an optional controller 208. For purposes of this disclosure, electromagnetic radiation directing is defined to be a passive operation, or an operation performed by stationary components. Electromagnetic radiation steering is defined to be an active operation, or an operation performed by a reconfigurable or moving component, or a component that is transitioned through a sequence of variable or discrete state changes.

The components of the panoramic optical scanner 200 may be mounted on or within a housing 210. The housing 210 may be a monolithic structure or include multiple parts.

The electromagnetic radiation source 202 may have an axis 212 (e.g., an imaginary axis), and in some cases may include a single electromagnetic radiation emitter (e.g., a vertical-cavity surface-emitting laser (VCSEL), a vertical external-cavity surface-emitting laser (VECSEL), or a light-emitting diode (LED) (e.g., an organic LED (OLED), a resonant-cavity LED (RC-LED), a micro LED (mLED), a superluminescent LED (SLED)), an edge-emitting LED, and so on). Alternatively, the electromagnetic radiation source 202 may include multiple electromagnetic radiation emitters, which emitters may be grouped and oriented to effectively emit a single beam of electromagnetic radiation emitted along the axis 212, or spaced radially about the axis 212 and oriented to emit different beams of electromagnetic radiation about or near the axis 212. In some cases, a set of electromagnetic radiation emitters may be disposed in circular symmetry about the axis 212. In some embodiments, the controller 208 may be configured to activate or deactivate different combinations of electromagnetic radiation emitters as an optical component 214 (e.g., a reflector or mirror) is rotated about the axis 212 to steer electromagnetic radiation non-symmetrically about the axis. As defined herein, electromagnetic radiation emitted along or about an axis is defined to be emitted on the axis, concentric with the axis, near and parallel to the axis, or near and converging or diverging within a small radius from the axis. In some cases, electromagnetic radiation may intersect the axis.

The electromagnetic radiation source 202 (e.g., a light source), electromagnetic radiation director 204 (e.g., a light directing module or set of optics), and electromagnetic radiation steering assembly 206 (e.g., a light steering assembly) may be disposed along and about the axis 212. As defined herein, components disposed along the axis 212 are disposed about or intersect the axis 212 at different overlapping or non-overlapping locations along the axis 212, whereas components disposed about the axis 212 are positioned at least radially around the axis 212, and may or may not intersect the axis 212. The electromagnetic radiation director 204 may be positioned along the axis 212 between the electromagnetic radiation source 202 and electromagnetic radiation steering assembly 206.

The electromagnetic radiation steering assembly 206 (e.g., a light steering assembly) may include an optical component 214, such as a reflector, that is disposed about and/or intersects the axis 212 non-symmetrically, and is movable through different non-symmetric orientations with respect to the axis 212. Alternatively, optical component 214 may include or be replaced by a set of one or multiple moving or non-moving reflective, refractive, and/or diffractive elements (e.g., an array of elements) that is disposed about and/or intersects the axis 212 symmetrically or asymmetrically. The electromagnetic radiation steering assembly 206, and in particular the optical component 214, may be configured to steer received light non-symmetrically about the axis 212. For example, the optical component 214 may include a reflector that is skewed with respect to the axis 212, and the controller 208 may be configured to rotate the reflector about the axis 212 (or about an axis parallel to the axis 212) to reflect light non-symmetrically about the axis 212. Alternatively, the optical component 214 or electromagnetic radiation steering assembly 206 may include a single or multiple stages of non-moving optical steering components, including, for example, an optical phase array, an electro-optical modulator, an acoustic-optical modulator, an electrically-driven liquid, or a liquid crystal beam-shaping component. These alternative components may be disposed symmetrically or non-symmetrically about the axis 212, and the controller 208 may drive these components to dynamically reflect, refract, and/or diffract electromagnetic radiation non-symmetrically about the axis 212.

Electromagnetic radiation emitted by the electromagnetic radiation source 202 (e.g., a light source) may be directed toward the electromagnetic radiation steering assembly 206 (e.g., a light steering assembly) by the electromagnetic radiation director 204 (e.g., a light directing module or set of optics). For example, a first or inner portion of a light directing module may direct light emitted by a light source toward a light steering assembly. Electromagnetic radiation received at the electromagnetic radiation steering assembly 206, from the electromagnetic radiation director 204, may be steered toward a second portion of the electromagnetic radiation director 204 (e.g., toward a second or outer portion of a light directing module). In some embodiments, the electromagnetic radiation may be steered by rotating the optical component 214 about the axis 212, or by the reflection, refraction, and/or diffraction of electromagnetic radiation by a set of actively driven but non-moving beam steering components. Electromagnetic radiation received from the electromagnetic radiation steering assembly 206, at the electromagnetic radiation director 204 (e.g., at the second or outer portion of a light directing module), may be directed into a panoramic field of view about the axis 212. In some cases, electromagnetic radiation may be shaped (or reshaped) as it is directed or steered by the electromagnetic radiation director 204 and/or optical component 214.

In some embodiments, the electromagnetic radiation director 204 (e.g., a light directing module) may include a monolithic dielectric through which electromagnetic radiation passes from the electromagnetic radiation source 202 to the electromagnetic radiation steering assembly 206, and from the electromagnetic radiation steering assembly 206 to the panoramic field of view. The monolithic dielectric may have different portions for directing electromagnetic radiation in different ways, and in some cases may have reflective coatings or elements (or other types of coatings, elements, or features) thereon or abutted thereto. In some embodiments, the monolithic dielectric may include locally textured or patterned surfaces, or treated portions or surfaces for diffractive beam shaping. In some embodiments, the monolithic dielectric may be symmetric about the axis 212. In other embodiments, the monolithic dielectric may be non-symmetric about the axis 212 (as described, for example, with reference to FIG. 13).

The controller 208 may control, for example: when the electromagnetic radiation source 202 emits and does not emit electromagnetic radiation, an intensity of the electromagnetic radiation emitted by the electromagnetic radiation source 202, a modulation pattern used to encode information in the electromagnetic radiation emitted by the electromagnetic radiation source 202, or a beam steering orientation of the optical component 214. In some cases, the controller 208 may be configured to operate the electromagnetic radiation source 202 (e.g., activate and deactivate one or more emitters of the electromagnetic radiation source, or control the transmit power thereof) while controlling a beam steering orientation of the optical component 114 (e.g., while controlling the beam steering orientation (or rotation) of a reflector). In some embodiments, control signals may be provided to the electromagnetic radiation source 202 and electromagnetic radiation steering assembly 206 via a bus 216 or other circuitry.

The controller 208 may communicate with one or more optical trackers or other devices via an optional communications interface 218 (e.g., an RF interface, such as a wireless or wired communications interface, and/or an optical communications interface).

The controller 208 may cause a timing reference of the panoramic optical scanner 200, such as a timing reference that is synchronized with the beam steering orientation of the optical component 214, to be broadcast from the panoramic optical scanner 200. In some embodiments, the timing reference may be broadcast by means of a trigger module 220 operated by the controller 208 (or alternatively, by the electromagnetic radiation steering assembly 206). The trigger module 220 may emit an omnidirectional or limited direction optical timing pulse. Additionally or alternatively, the time reference may be internally fed back to the controller's driver to stabilize the repetition rate of the optical component's periodic beam steering (e.g., to minimize the time jitter between or within a beam steering period of the optical component 214). Alternatively, the panoramic optical scanner 200 may broadcast a timing reference in other ways, as described, for example, with reference to FIG. 13 or 14.

In some embodiments, the electromagnetic radiation source 202 and electromagnetic radiation director 204 (e.g., a light source and light directing module or other optics) may be mounted in fixed stationary positions within the housing 210. The electromagnetic radiation steering assembly 206 (e.g., a light steering assembly) may also be mounted within the housing 210, but may include a motor, a solid-state device such as a MEMS, or another component (or components) configured to rotate or actuate the optical component 214 through different non-symmetric orientations with respect to the axis 212. This may reduce the number or weight of parts that need to move within the housing 210, and may reduce the cost and power consumption of the panoramic optical scanner 200.

Figure 3A:
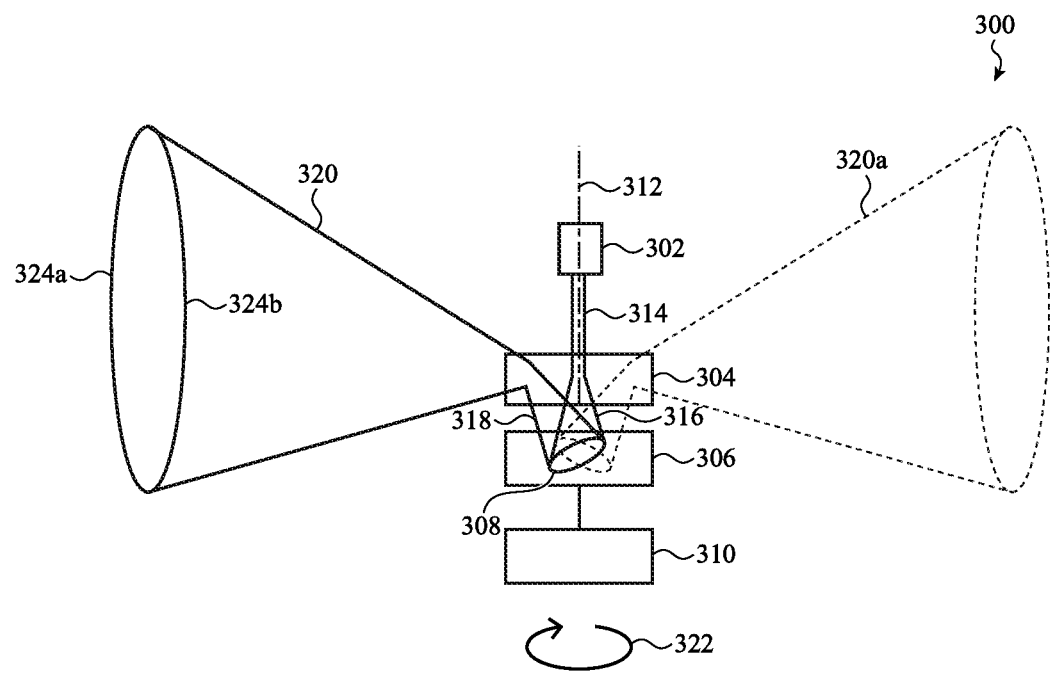
FIGS. 3A & 3B show example embodiments of the panoramic optical scanner described with reference to FIG. 2.
Figure 3B:
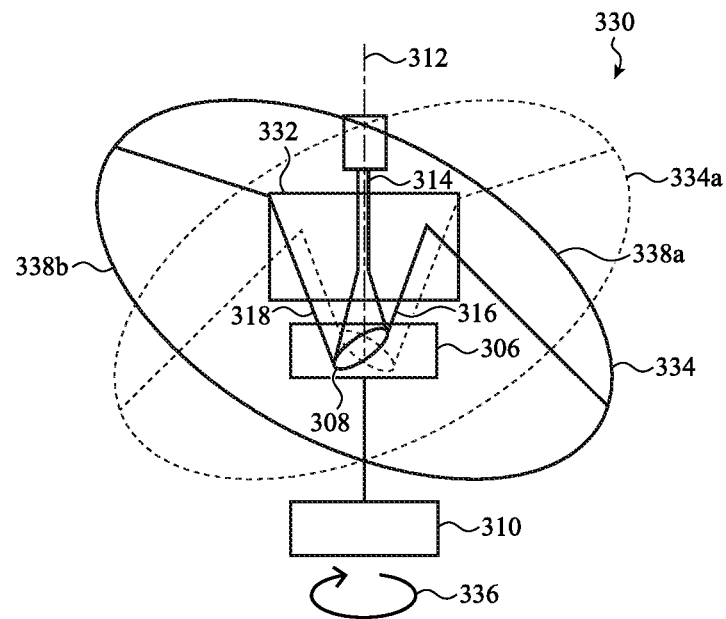

FIGS. 3A & 3B show example embodiments of the panoramic optical scanner described with reference to FIG. 2. FIG. 3A shows a panoramic optical scanner 300 including an electromagnetic radiation source 302, an electromagnetic radiation director (e.g., a set of optics 304), an electromagnetic radiation steering assembly 306 including a reflector 308, and an optional controller 310. In some embodiments, the components of the panoramic optical scanner 300 may be mounted on or within a housing, such as the housing described with reference to FIG. 2.

The electromagnetic radiation source 302 may have an axis 312 (e.g., an imaginary axis). The electromagnetic radiation source 302, the set of optics 304, and the reflector 308 may be disposed along and about the axis 312. By way of example, the set of optics 304 and reflector 308 intersect the axis 312 (though they need not—e.g., one or both of these elements may have a central void therein).

The reflector 308 may be disposed about the axis non-symmetrically, and may be disposed to reflect electromagnetic radiation emitted by the electromagnetic radiation source 302. The reflector 308 may be moved through different non-symmetric orientations with respect to the axis 312 (e.g., the reflector 308 may be rotated or wobbled about the axis 312, or about an axis that is parallel to and offset from the axis 312).

The controller 310 may be configured to operate the electromagnetic radiation source 302 while controlling the beam steering orientation (e.g., the rotation or wobbling) of the reflector 308. More specifically, the controller 310 may control, for example: when the electromagnetic radiation source 302 emits and does not emit electromagnetic radiation, an intensity of the electromagnetic radiation emitted by the electromagnetic radiation source 302, a modulation pattern used to encode information in the electromagnetic radiation emitted by the electromagnetic radiation source 302, or a position or beam steering orientation of the reflector 308. The controller 310 may be configured to operate the electromagnetic radiation source 302 (e.g., activate and deactivate one or more emitters of the electromagnetic radiation source, or control the transmit power thereof) while controlling the beam steering orientation of the reflector 308.

The set of optics 304 may be disposed to shape electromagnetic radiation emitted by the electromagnetic radiation source 302 and direct electromagnetic radiation received from the reflector 308 into a panoramic field of view about the axis 312. In some embodiments, the set of optics 304 may receive and shape electromagnetic radiation as it passes from the electromagnetic radiation source 302 to the reflector 308, or alternatively may have a central aperture that lets electromagnetic radiation emitted by the electromagnetic radiation source 302 pass directly to the reflector 308. Additionally or alternatively, the set of optics 304 may receive and shape electromagnetic radiation as it passes from the reflector 308 to the panoramic field of view.

In some examples, the set of optics 304 may receive a beam of electromagnetic radiation 314 emitted by the electromagnetic radiation source 302 and shape the beam of electromagnetic radiation 314 into a ring (i.e., a circle), oval, teardrop, or other closed form shape of electromagnetic radiation 316. Alternatively, the shape may be open at the top or bottom or have a pixelated outline. Regardless of how the electromagnetic radiation is shaped, the electromagnetic radiation may be generally shaped to define a leading edge and a trailing edge, which edges may be detected by a photodetector of an optical tracker.

In some embodiments, a first element, portion, or subset of the set of optics 304 may direct electromagnetic radiation emitted by the electromagnetic radiation source 302 toward the reflector 308, and the reflector 308 may reflect electromagnetic radiation 318 toward a second element, portion, or subset of the set of optics 304. The second element, portion, or subset of the set of optics 304 may direct electromagnetic radiation 320 into a panoramic field of view about the axis 312. For example, the set of optics 304 may direct electromagnetic radiation 320 (e.g., ring-shaped electromagnetic radiation) to one side of the axis 312. The electromagnetic radiation 320 may be swept about the axis 312 (e.g., to position 320a and other positions) as the reflector 308 rotates about the axis 312. Given a direction of rotation 322, the ring-shaped electromagnetic radiation has a leading edge 324a and a trailing edge 324b.

In some embodiments, the set of optics 304 may include a monolithic dielectric through which electromagnetic radiation passes, from the electromagnetic radiation source 302 to the reflector 308, and from the reflector 308 to the panoramic field of view. The monolithic dielectric may have different portions for directing electromagnetic radiation in different ways, and in some cases may have reflective coatings or elements (or other types of coatings, elements, or features) thereon. The monolithic dielectric may also include textured or patterned surfaces, or treated portions or surfaces. In some embodiments, the monolithic dielectric may be symmetric about the axis 312. In other embodiments, the monolithic dielectric may be non-symmetric about the axis 312 (as described, for example, with reference to FIG. 13).

The electromagnetic radiation steering assembly 306 may include a motor having a rotatable element (e.g., a shaft) coupled to the reflector 308. Alternatively, the electromagnetic radiation steering assembly 306 may electrically or magnetically rotate the reflector 308. In some embodiments, the electromagnetic radiation steering assembly 306 may include a MEMS, and the reflector 308 may include one or more movable surfaces of the MEMS.

As shown, the set of optics 304 directs the electromagnetic radiation it receives from the reflector 308 to one side of the axis 312, and as the reflector 308 rotates, electromagnetic radiation 320 is swept around the axis 312. FIG. 3B shows a panoramic optical scanner 330 configured similarly to the panoramic optical scanner 300 described with reference to FIG. 3A, but with a different set of optics 332. The set of optics 332 directs the electromagnetic radiation 318 it receives from the reflector 308 into a ring 334 about the axis 312, and as the reflector 308 rotates, the ring 334 is caused to wobble about the axis 312 (e.g., to position 334a and other positions). Given a direction of rotation 336, the ring-shaped electromagnetic radiation has a leading edge 338a and a trailing edge 338b.

FIGS. 4A-4D show example portions or subsets of the optics 304 or 332 described with reference to FIGS. 3A & 3B, which portions or subsets may be used to shape the electromagnetic radiation emitted by an electromagnetic radiation source (e.g., a point electromagnetic radiation source or set of point electromagnetic radiation sources that, together, function as a point electromagnetic radiation source or otherwise produce a beam or beams of electromagnetic radiation). The beam of electromagnetic radiation to be shaped may be generally columnar, or may diverge in the same or different amounts in different directions.

Figure 4A:
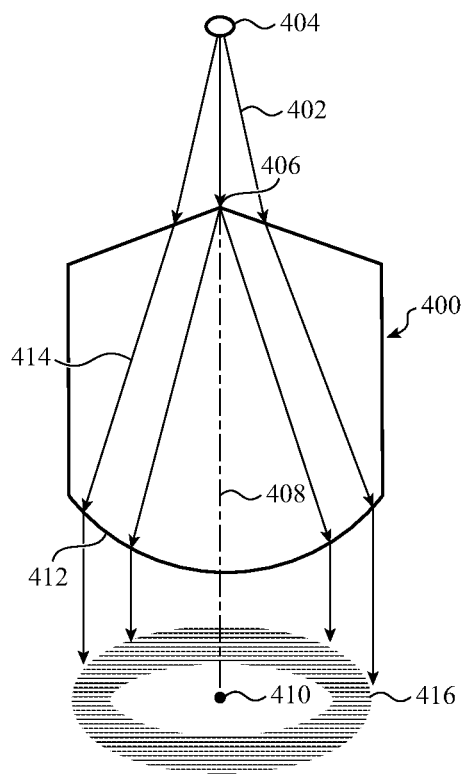
FIGS. 4A-4D show example portions or subsets of the optics described with reference to FIGS. 3A & 3B, which portions or subsets may be used to shape the electromagnetic radiation emitted by an electromagnetic radiation source.

FIG. 4A shows an axicon lens 400 that receives a beam of electromagnetic radiation 402 from an electromagnetic radiation source 404. The beam of electromagnetic radiation 402 is received at an apex 406 of the axicon lens 400 and the axicon lens 400 bends the beam radially outward in all radial directions with respect to an axis 408 of the axicon lens 400, thereby producing a null point 410 within the center of the beam of electromagnetic radiation 402.

A convex surface 412 of the axicon lens 400, opposite the apex 406, may collimate rays 414 and converge the outwardly bent ring into a ring of electromagnetic radiation 416 having a predetermined diameter. Alternatively, the axicon lens 400 may have a convex surface (i.e., a surface with a positive optical power) as a first or incident surface (to collimate the input beam) and an axicon surface (which has an apex but no optical power) as a second or output surface. A convex surface and axicon surface may also be combined into a same surface, or duplicated to achieve a better beam quality and optimal beam size.

Figure 4B:
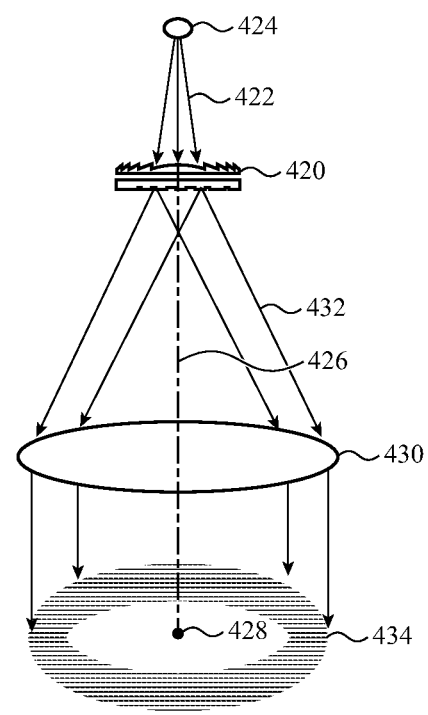

FIG. 4B shows the use of diffractive optics 420 to bend a beam of electromagnetic radiation 422 received from an electromagnetic radiation source 424. Rays of the beam of electromagnetic radiation 422 are bent outward in all radial directions with respect to an axis 426 of the diffractive optics 420, thereby producing a null point 428 within the center of the beam of electromagnetic radiation 422. A lens 430 may be used to collimate rays 432 of the outwardly bent and diverging beam into a ring of electromagnetic radiation 434 having a predetermined diameter. Compared with the design of the axicon lens 400 described with reference to FIG. 4A, the diffractive optics 420 is lateral alignment-free. It is also possible to integrate the optical power of the lens 430 into the diffractive optics design and minimize the optical thickness of the device. The diffractive optics 420 may also be configured to shape the incoming beam of electromagnetic radiation 422 into irregular shapes, such as a flower shape, or in an asymmetric shape such as an oval, a teardrop, and so on. Such alternative shapes may provide advanced panoramic scanning functionalities.

Figure 4C:
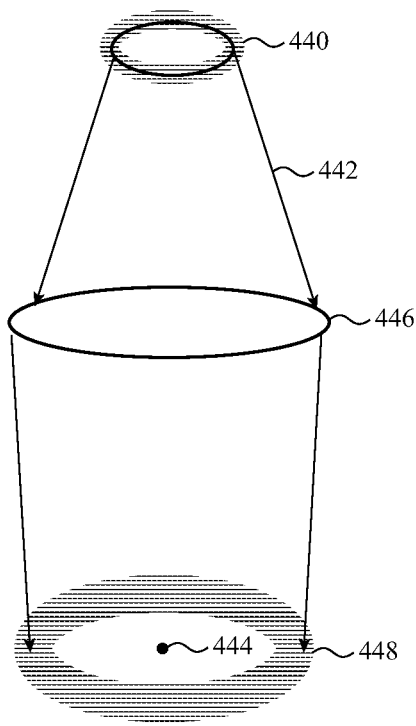

FIG. 4C shows an electromagnetic radiation source 440 that may produce a beam of electromagnetic radiation 442 having a predetermined shape. The shape may be formed by an optical aperture over the electromagnetic radiation source 440, or by a high-order donut transverse mode of the electromagnetic radiation source 440. As shown, the beam of electromagnetic radiation 442 may have a donut shape (e.g., with a null center 444). Rays of the beam of electromagnetic radiation may diverge, such that the donut expands in diameter until received by a lens 446 that re-images the rays of the diverging beam into a ring of electromagnetic radiation 448 having a predetermined diameter.

Figure 4D:
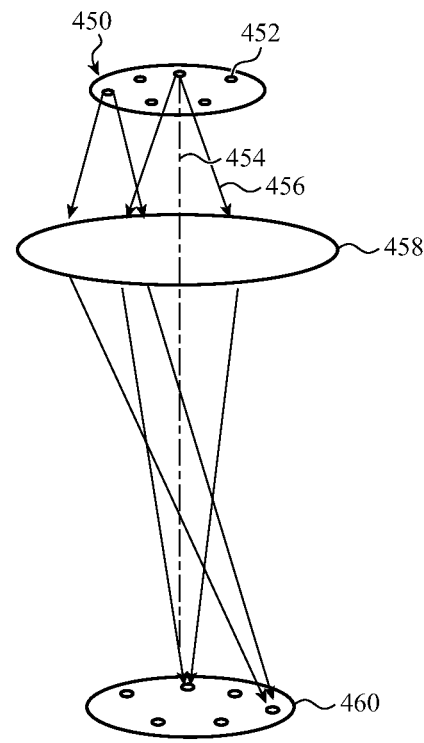

FIG. 4D shows an electromagnetic radiation source 450 comprised of a set of electromagnetic radiation emitters 452 disposed in circular symmetry about an axis 454. When all of the electromagnetic radiation emitters 452 are caused to emit electromagnetic radiation 456, the electromagnetic radiation may form a ring of electromagnetic radiation that diverges radially outward as well as inward, thus increasing the thickness of the ring. The rays of the diverging ring may be received by a lens 458 that focuses the rays along a ring 460 having predetermined inner and outer diameters. When a controller activates or deactivates different combinations of the electromagnetic radiation emitters 452, differently coded patterns of electromagnetic radiation may be produced.

Figure 5:
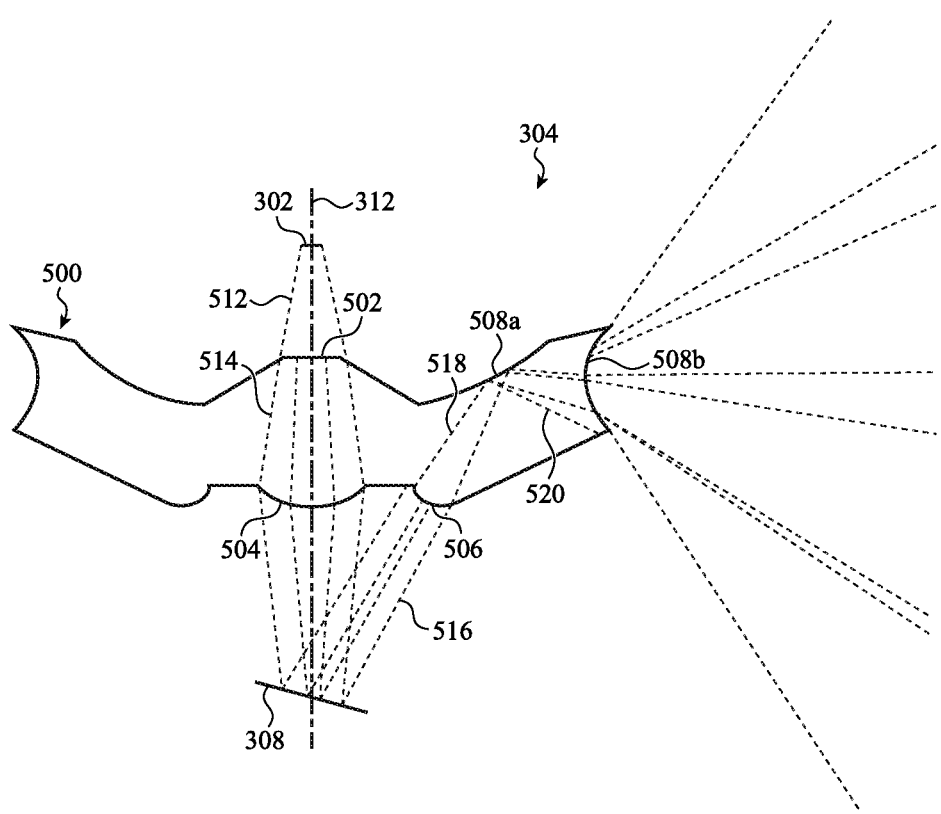
FIG. 5 shows an example of the optics described with reference to FIG. 3A.

FIG. 5 shows an example of the set of optics 304 described with reference to FIG. 3A. In FIG. 5, the set of optics 304 is provided by a monolithic dielectric 500. The monolithic dielectric 500 may include, for example, a beam shaping surface 502, a condenser 504 (i.e., another beam shaping surface), a field lens 506, and/or a beam shaper and expander 508. The monolithic dielectric 500 may have a circular symmetry about an axis 312, with all of the dielectric's elements being axial or coaxial.

The beam shaping surface 502 may by disposed at the center of one side of the monolithic dielectric 500, and the condenser 504 may be disposed at the center of an opposite side of the monolithic dielectric 500. The beam shaping surface 502 may receive a beam of electromagnetic radiation 512 emitted by an electromagnetic radiation source 302, reflect or absorb electromagnetic radiation at the center of the beam of electromagnetic radiation 512 (e.g., due to a mask), and pass electromagnetic radiation 514 shaped in a ring. The condenser 504 may receive the electromagnetic radiation 514 passed by the beam shaping surface 502 and collimate or converge it as it exits the monolithic dielectric 500 traveling toward the reflector 308. Alternatively, and by way of example, the beam shaping surface 502 may be an axicon surface, as described with reference to FIG. 4A, or a diffractive optical element, as shown in FIG. 4B (e.g., to create a ring-shaped optical field with low loss).

The field lens 506 may be disposed in a ring about the condenser 504, on the same side of the monolithic dielectric 500 as the condenser 504. Electromagnetic radiation 516 reflected by the reflector 308 may be received by one portion of the field lens 506, and by different portions of the field lens 506 as the reflector 308 rotates about the axis 312. A portion 508*a* of the beam shaper and expander 508 (e.g., a portion of the top surface of the monolithic dielectric 500, on the same side of the monolithic dielectric 500 as the beam shaping surface 502) may receive the electromagnetic radiation 518 that passes through the field lens 506, and may be curved, polished, or treated to ensure total internal reflection (TIR) of the electromagnetic radiation. Alternatively or additionally, a reflective coating or element may be deposited on the portion 508*a* of the top surface. The electromagnetic radiation 520 reflected from the top surface of the monolithic dielectric may exit the monolithic dielectric 500 through a peripheral portion 508*b* of the beam shaper and expander 508, and may be directed into a panoramic field of view by the beam shaper and expander 508. The electromagnetic radiation directed into the panoramic field of view may be ring-shaped. In some embodiments, the beam shaper and expander 508 may include a generally concave surface formed around the periphery or circumference of the monolithic dielectric 500 (e.g., to achieve a maximum vertical field of view).

In some embodiments, the peripheral portion 508*b* of the beam shaper and expander 508 may be non-symmetric from top to bottom, and may be generally concave. In these embodiments, the beam shaper and expander 508 may direct electromagnetic radiation that is teardrop-shaped into the panoramic field of view.

Figure 6:
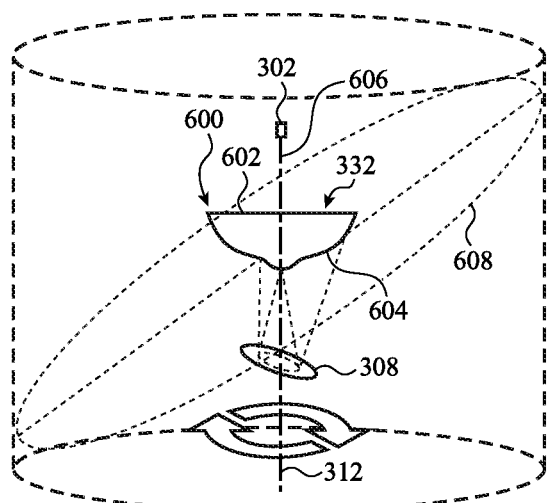
FIG. 6 shows an example of the set of optics described with reference to FIG. 3B.

FIG. 6 shows an example of the set of optics 332 described with reference to FIG. 3B. In FIG. 6, the set of optics 332 is provided by a monolithic dielectric 600. The monolithic dielectric 600 may include, for example, a first surface 602 and a second surface 604, with the first surface being flat or generally so, the second surface 604 being curved, and the second surface 604 being generally opposite the first surface 602.

Electromagnetic radiation 606 emitted by an electromagnetic radiation source 302 may enter the monolithic dielectric 600 through a central portion of the first surface 602 and be shaped into a ring as it enters a central diffractive optical element on surface 602, or as it exits the monolithic dielectric 600 through or about a central rounded transmission apex of the second surface 604. The ring shaped electromagnetic radiation may be directed toward the reflector 308. The reflector 308 may be oriented to reflect electromagnetic radiation toward a curved reflective portion of the second surface 604, concentric with and outside the central rounded apex of the second surface 604. The curved portion of the second surface 604 may be curved, and in some cases polished or treated, such that it redirects (e.g., reflects) electromagnetic radiation received from the reflector 308 into a panoramic field of view. Because the reflector 308 is skewed with respect to an axis 312 of the monolithic dielectric 600 and the electromagnetic radiation source 302, electromagnetic radiation reflected at different points about the central rounded apex may be received and reflected from the curved surface at different distances (i.e., different radii) from the central rounded apex, causing ring-shaped electromagnetic radiation 608 to be directed into the entire circumference of the panoramic field of view, and causing the ring-shaped electromagnetic radiation 608 to wobble about the axis 312 as the reflector 308 rotates.

Figure 7A:
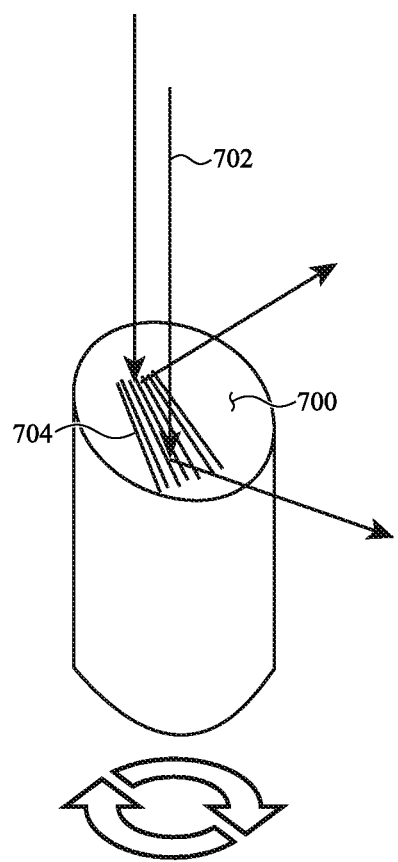
FIGS. 7A & 7B show example embodiments of the optical component or reflector described with reference to FIGS. 2, 3A, 3B, 5, & 6.
Figure 7B:
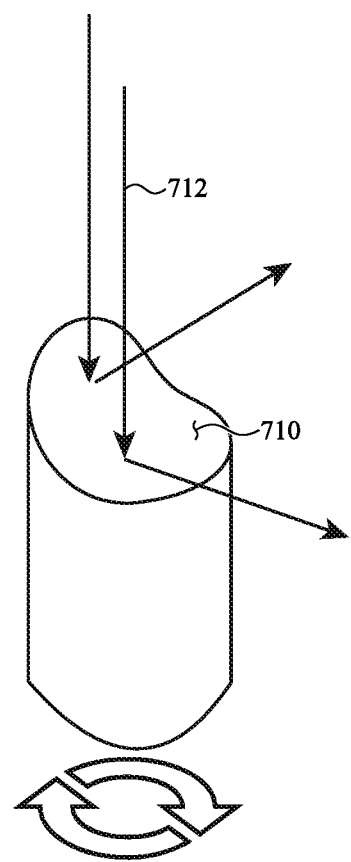

FIGS. 7A & 7B show example embodiments of the optical component 214 or reflector 308 described with reference to FIGS. 2, 3A, 3B, 5, & 6 when the optical component 214 or reflector 308 is a mechanically-rotated element. As shown in FIG. 7A, a reflector 700 may have a surface that shapes electromagnetic radiation 702 (in addition to steering the electromagnetic radiation). The surface may be generally flat with a 1-dimensional (1D) fan-out reflective grating 704 thereon. In some embodiments, the fan-out reflective grating 704 may have a gradually changing −1 order diffraction (with all other orders suppressed), and may receive and reflect electromagnetic radiation 702 emitted by an electromagnetic radiation source, with the electromagnetic radiation optionally being received through a set of optics (e.g., the set of optics 304 or 332 described with reference to FIG. 3A or 3B.

As shown in FIG. 7B, a reflector 710 may have a surface that shapes electromagnetic radiation 712. The surface may include a 2-dimensional (2D) multilevel reflective DOE that receives and reflects electromagnetic radiation 712 emitted by an electromagnetic radiation source, with the electromagnetic radiation 702 optionally being received at the surface through a set of optics.

Figure 8:
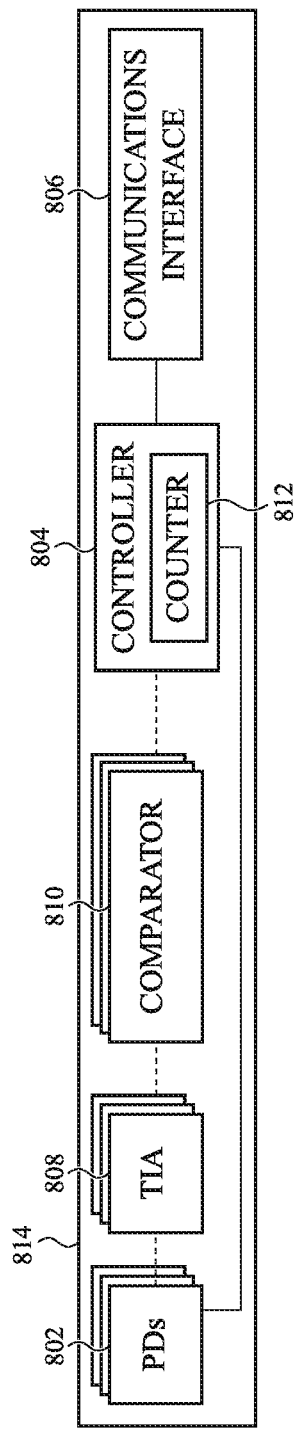
FIG. 8 shows an example block diagram of an optical tracker capable of detecting the electromagnetic radiation emitted by a panoramic optical scanner.

Turning now to FIG. 8, there is shown an example block diagram of an optical tracker 800 capable of detecting the electromagnetic radiation emitted by a panoramic optical scanner. The optical tracker 800 may include a set of multiple photodetectors (PDs) 802 and a controller 804. The photodetectors 802 may be distributed over various surfaces of a device (e.g., goggles, a game controller, or a smartphone) that includes the optical tracker, such that the device may detect the electromagnetic radiation edges emitted by a panoramic optical scanner with at least four photodetectors of the optical tracker, regardless of the device's posing. Each photodetector may have a fixed spatial and orientation relationship with respect to other photodetectors in the set of multiple photodetectors.

The controller 804 may operate the photodetectors 802 and receive signals from the photodetectors 802. In some embodiments, the controller 804 may communicate with a panoramic optical scanner or other devices via a communications interface 806 (e.g., an RF interface, such as a wireless or wired communications interface, and/or an optical communications interface).

When electromagnetic radiation edges emitted by a panoramic optical scanner are sensed by at least two photodetectors of the optical tracker 800, angular triangulation may be employed by the controller 804 or another device to determine a range of the optical tracker 800 from the panoramic optical scanner. When electromagnetic radiation edges emitted by a panoramic optical scanner are sensed by at least four photodetectors 802 of the optical tracker 800, a posing of the optical tracker 800 in relation to a posing of the panoramic optical scanner may be determined by the controller 804 or another device without spatial ambiguity. The optical tracker 800 may include more than four photodetectors, and in some cases many more, so that regardless of how the optical tracker 800 is oriented, at least 2-4 of the photodetectors are always capable of receiving electromagnetic radiation emitted by a panoramic optical scanner.

In some embodiments of the optical tracker 800, each photodetector in the set of multiple photodetectors 802 may be coupled to a respective transimpedance amplifier (TIA) 808 to convert photocurrent from photodetectors into amplified voltage, which in turn may be coupled to a respective comparator 810. In some embodiments, the comparator 810 may be a non-inverting comparator with hysteresis. The comparator 810 may determine, from comparing the TIA output voltage with a predetermined or dynamically tuned voltage threshold, when an electromagnetic radiation edge has been sensed by a photodetector. In some embodiments, each photodetector 802 may sense two electromagnetic radiation edges associated with a pattern of electromagnetic radiation—a leading edge and a trailing edge per scanning period of a single panoramic optical scanner.

The controller 804 may determine (e.g., from outputs of the comparators 810) a timing of each electromagnetic radiation edge in relation to a timing reference received from the panoramic optical scanner. In some embodiments, the timing reference may be received in the form of an optical timing pulse (e.g., a flash) detected via the communications interface or a simpler optical trigger detector. The optical timing pulse may be an omnidirectional or limited direction pulse emitted by the panoramic optical scanner, and may have a predetermined, known relationship with respect to the electromagnetic radiation that is swept through a panoramic field of view by the panoramic optical scanner. Alternatively or additionally, a timing reference may be determined from a changing modulation of the electromagnetic radiation emitted by a panoramic optical scanner, as described in more detail with reference to FIG. 14. A timing reference may also or alternatively be determined from a varying width of an electromagnetic radiation edge, as described in more detail with reference to FIG. 13. In some embodiments, the controller 804 may initiate a counter 812 running at an integer fraction of the controller clock frequency upon receipt of the timing reference, and may determine a time delay between receipt of the timing reference and receipt of an electromagnetic radiation edge using a value of the counter 812, adding latency compensation and thereby relating the timing of the electromagnetic radiation edge to the timing reference at the timing resolution of the counter clock.

The components of the optical tracker 800 may be mounted on or within a housing 814. The housing 814 may be a monolithic structure or include multiple parts.

Figure 9:
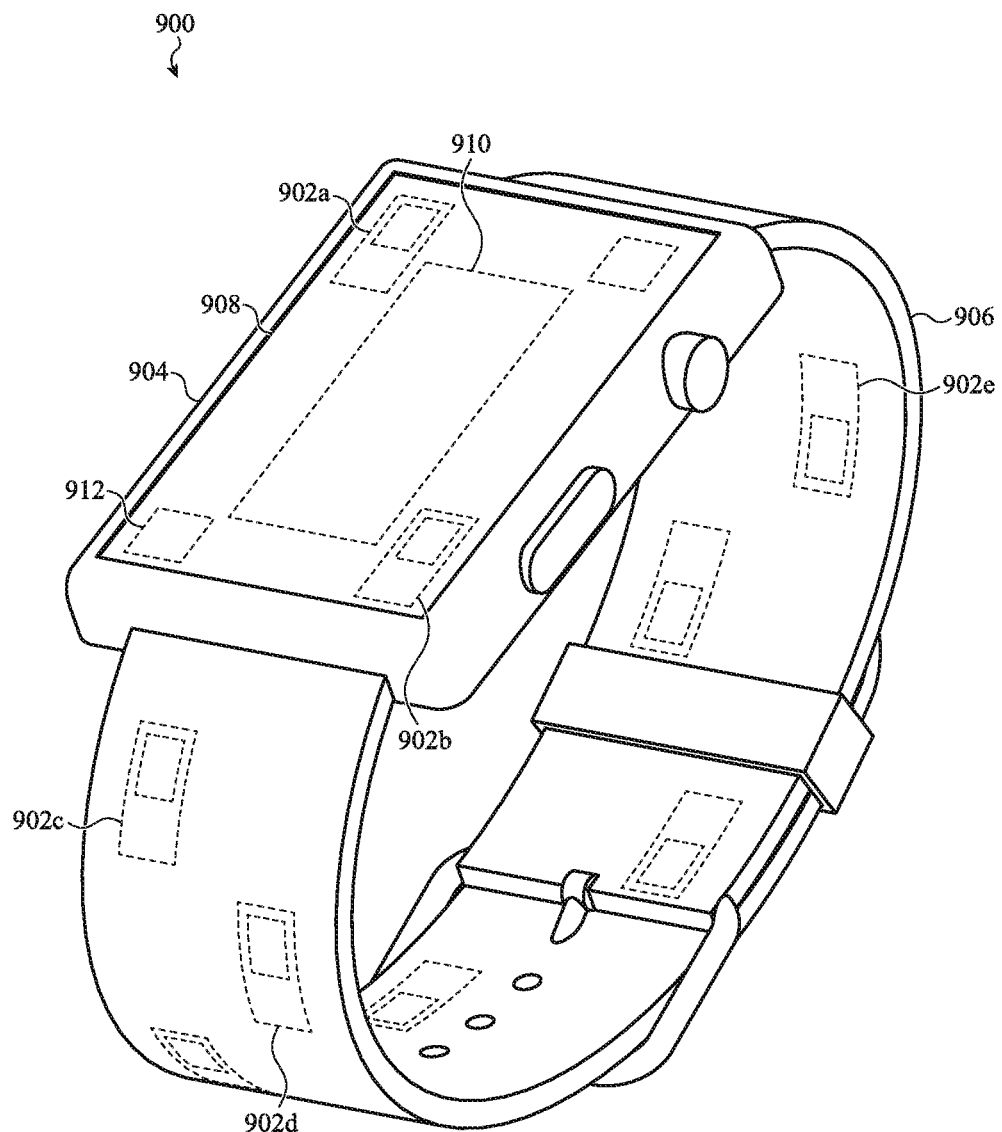
FIG. 9 shows an example controller that may incorporate photodetectors distributed at various locations over various surfaces of the controller.

FIG. 9 shows an example controller 900 (e.g., a game controller, a gesture input device, etc.) that may incorporate an optical tracker including photodetectors distributed, in sets or individually, at various locations 902 (e.g., locations 902a, 902b, 902c, 902d, and 902e) over various surfaces of the controller 900. By way of example, the controller 900 is shown to be a wearable device, such as a watch, fitness monitor, or health monitor. Alternatively, the controller 900 may be configured, for example, as a bracelet, sleeve, or handheld device. Orienting the photodetectors with their surfaces perpendicular to three or more axes (and preferably, but not necessarily, orthogonal axes), can enable movement of the controller 900 or gestures made by its wearer, to be tracked with six degrees of freedom.

A set of goggles may also incorporate an optical tracker including photodetectors. In some embodiments, the controller 900 or goggles may include sets of four or more photodetectors at various locations 902a, 902b, 902c, 902d, 902e. Photodetectors may be distributed over more or fewer surfaces of the controller 900 or goggles, or in a higher or lower density over one or more surfaces of the controller 900 or goggles. Alternatively, the controller 900 or goggles may include a panoramic optical scanner at one or more of the locations 902, or at other locations. For example, a set of goggles may include a panoramic optical scanner at each of its temples. When a device such as a set of goggles has multiple panoramic optical scanners, the panoramic optical scanners may have overlapping panoramic fields of view (e.g., overlapping 270 degree fields of view).

When the controller 900 is a wearable device having a body 904 (e.g., a watch body) and a band 906 (e.g., a watch band), photodetectors may be disposed in the body 904 and/or in the band 906. In some cases, photodetectors may be disposed at locations 902a, 902b around or under a display 908, and/or at locations 902c, 902d, 902e within the band 906. Photodetectors disposed within the band 906 may be communicatively coupled to a processor 910 housed within the body 904, by electrical conductors routed through the band 906 and its connections to the body 904, or may be coupled to a wireless communications interface within the band 906 that communicates with a wireless communications interface within the body 904 (which wireless communications interface within the body 904 is integrated with or coupled with the processor 910). In some embodiments, the wireless communications interfaces may be BLUETOOTH® Low Energy (BLE) wireless communications interfaces.

In some embodiments, the controller 900 may further include an inertial measurement unit (IMU) 912, which may be connected to the processor 910 and used to provide additional measurements pertaining to movement of the controller 900 (e.g., as described with reference to FIG. 16C).

Figure 10:
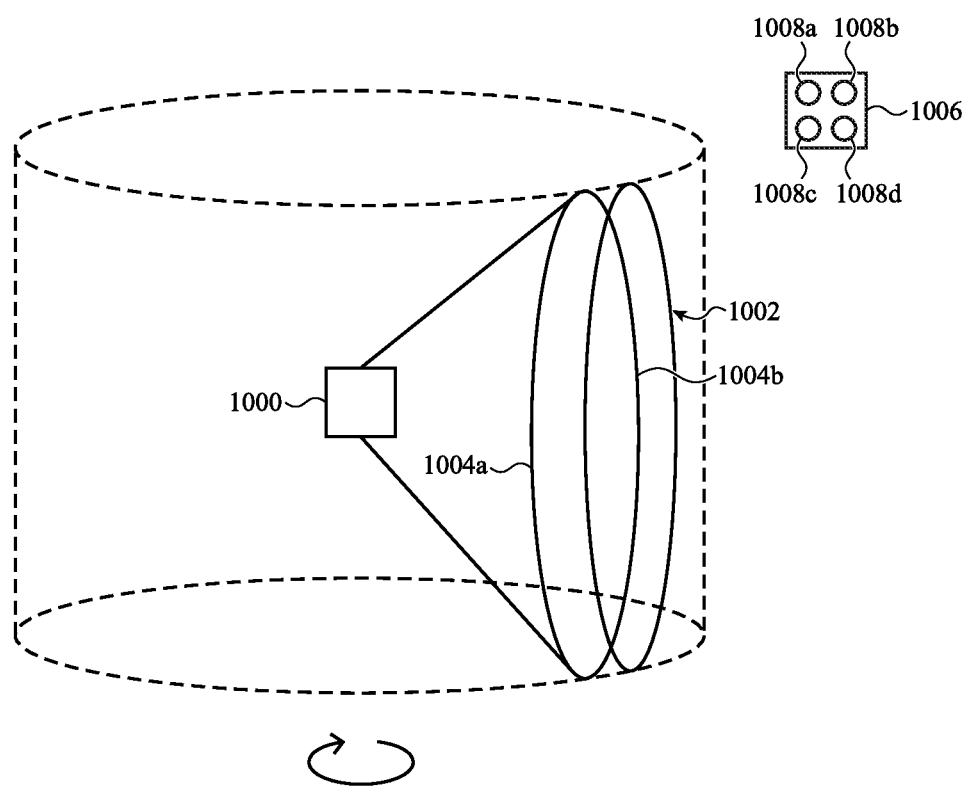
FIG. 10 shows how the electromagnetic radiation emitted by a panoramic optical scanner may sweep past the photodetectors of an optical tracker.

FIG. 10 shows how the electromagnetic radiation 1002 emitted by a panoramic optical scanner 1000, and in particular, edges 1004a, 1004b of the electromagnetic radiation 1002, may sweep past the photodetectors 1008 (e.g., photodetectors 1008a, 1008b, 1008c, and 1008d) of an optical tracker 1006.

Figure 11:
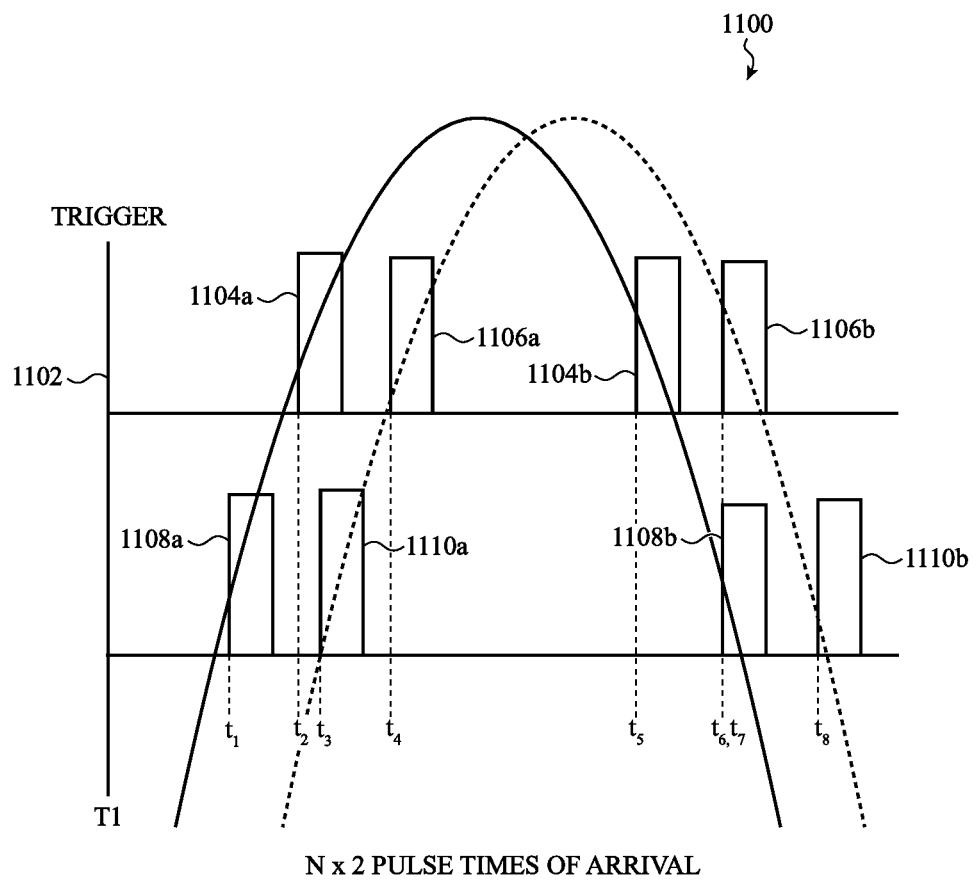
FIG. 11 shows an example set of electromagnetic radiation pulses that may be detected by an optical tracker.

FIG. 11 shows an example set of electromagnetic radiation pulses 1100 that may be detected by an optical tracker. An optical timing pulse 1102 (a trigger) may be received at time T1 (or may be determined, from other information, to have a timing of T1). The optical timing pulse 1102 may be detected using an optical communications interface of the optical tracker, a simpler optical trigger detector, or a plurality of the photodetectors used by the optical tracker to detect edges of electromagnetic radiation emitted by a panoramic optical scanner. The optical timing pulse 1102 may be an omnidirectional or limited direction timing pulse. When photodetectors used by the optical tracker to detect edges of electromagnetic radiation are also used to detect the optical timing pulse, detection of the optical timing pulse may be distinguished from detection of an electromagnetic radiation edge as a result of a plurality of photodetectors detecting electromagnetic radiation at substantially the same time. In some embodiments, the optical timing pulse may be emitted by a panoramic optical scanner in accord with a periodic interval synchronized with a periodic revolution of the optical component 214 or reflector 308 described with reference to FIG. 2, 3A, 3B, 5, or 6. Alternatively, the timing of the optical timing pulse 1102 may be determined from timing information encoded in the electromagnetic radiation edges received by the optical tracker.

A first set of pulses 1104 (e.g., pulses 1104a and 1104b) may indicate the timings of electromagnetic radiation edges sensed by a first photodetector of the optical tracker (e.g., the photodetector 1008a of the optical tracker 1006 described with reference to FIG. 10). The first photodetector may detect a leading edge at time t2, and a trailing edge at time t5. Similarly, a second set of pulses 1106 (e.g., pulses 1106a and 1106b) may indicate the timings (t4 and t6) of electromagnetic radiation edges detected by a second photodetector (e.g., the photodetector 1008b), a third set of pulses 1108 (e.g., pulses 1108a and 1108b) may indicate the timings (t1 and t7) of electromagnetic radiation edges detected by a third photodetector (e.g., the photodetector 1008c), and a fourth set of pulses 1110 (e.g., pulses 1110a and 1110b) may indicate the timings (t3 and t8) of electromagnetic radiation edges detected by a fourth photodetector (e.g., the photodetector 1008d).

The optical tracker may relate the timings of the electromagnetic radiation edges (e.g., t1, t2, t3, t4, t5, t6, t7, and t8) to an optical timing reference (e.g., T1). The timing relationship between the pulses of a set of pulses (e.g., pulses 1104, 1106, 1108, or 1110), the timing relationships between pulses in different sets of pulses (e.g., pulses 1102, 1104, 1106, 1108, and 1110), the known spatial and orientation relationships between the fixed locations of the photodetectors, or the known posing of the panoramic optical scanner at the time an optical timing pulse or electromagnetic radiation edge is emitted, may enable a controller of the optical tracker to determine a posing of the optical tracker with respect to the posing of the panoramic optical scanner. Alternatively or additionally, the panoramic optical scanner or another device may determine the posing of the optical tracker with respect to the posing of the panoramic optical scanner. Information known by one device and not the other may be shared with the other device via communications interfaces of the devices.

Figure 12:
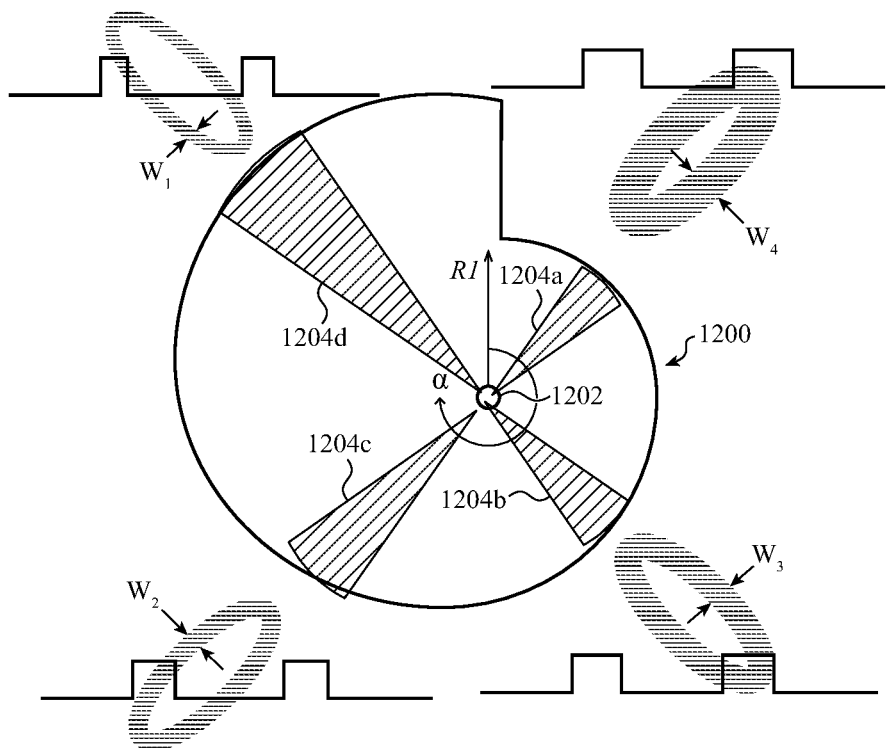
FIGS. 12 & 13 illustrate alternative ways for a panoramic optical scanner to provide a timing reference to an optical tracker.

FIG. 12 illustrates an alternative way for a panoramic optical scanner to provide a timing reference to an optical tracker. In particular, FIG. 12 shows a plan view of a set of optics 1200 having an axis 1202. The set of optics 1200 may be non-symmetric about the axis 1202, and in some cases may have a radius that increases with respect to an angle (a) defined in relation to a reference radius (R1).

Electromagnetic radiation initially emitted by an electromagnetic radiation source may be reflected by a reflector into the set of optics 1200. In some embodiments, the electromagnetic radiation source and reflector may be the electromagnetic radiation source and reflector described with reference to FIG. 2, 3A, or 3B. The electromagnetic radiation reflected into the set of optics 1200 from the reflector may be directed outward from the axis (e.g., as electromagnetic radiation 1204a, 1204b, 1204c, or 1204d), and the variable radius of the optics 1200 (and/or a possible varying height or shape or other aspects of the optics 1200 about its periphery) may vary the width (e.g., W1, W2, W3, or W4) of electromagnetic radiation edges (e.g., a leading edge and a trailing edge) emitted from the optics 1200. The varying widths of the electromagnetic radiation edges may enable an optical tracker to derive a timing reference of the panoramic optical scanner using detected widths of electromagnetic radiation edges. In an alternative configuration of the optics 1200, the optics 1200 may be symmetric about the axis 1202 but have a gradually changing diffractive optical pattern about its periphery, which changing diffractive optical pattern may modulate the width of the electromagnetic radiation edges emitted from the optics 1200.

Figure 13:
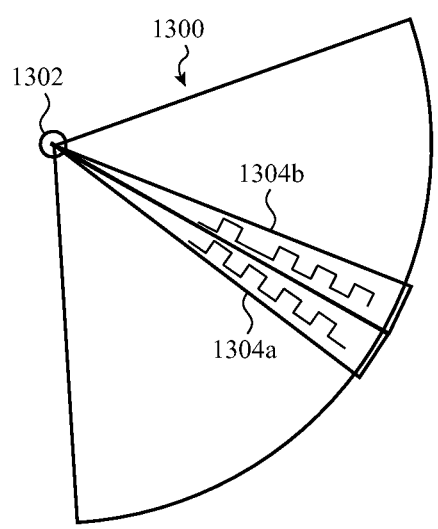

FIG. 13 illustrates another alternative way for a panoramic optical scanner to provide a timing reference to an optical tracker. In particular, FIG. 13 shows an axis 1302 of an electromagnetic radiation source and set of optics, and a portion 1300 of a panoramic field of view in which the panoramic optical scanner directs electromagnetic radiation emitted by the electromagnetic radiation source. As a non-symmetric reflector rotates about the axis 1302, a controller of the panoramic optical scanner may modulate the electromagnetic radiation emitted by the electromagnetic radiation source differently, in an angular dependent manner. Thus, at a first angle or orientation of a reflector that is non-symmetric about the axis 1302, the electromagnetic radiation may be modulated in a first manner (e.g., in accordance with a modulation pattern 1304a), and at a second angle or orientation, the electromagnetic radiation may be modulated in a second manner (e.g., in accordance with a modulation pattern 1304b). In various embodiments, the modulation may include on-off-keying (OOK) modulation, phase modulation, and so on. Alternatively or additionally, the electromagnetic radiation may be modulated at a particular base frequency (e.g., 1 MegaHertz (MHz)) regardless of reflector orientation. Modulation of the electromagnetic radiation at a base frequency may enable an optical tracker to sense electromagnetic radiation at the same frequency, and thereby mitigate the likelihood of detecting ambient light instead of the electromagnetic radiation emitted by a panoramic optical scanner.

Figure 14:
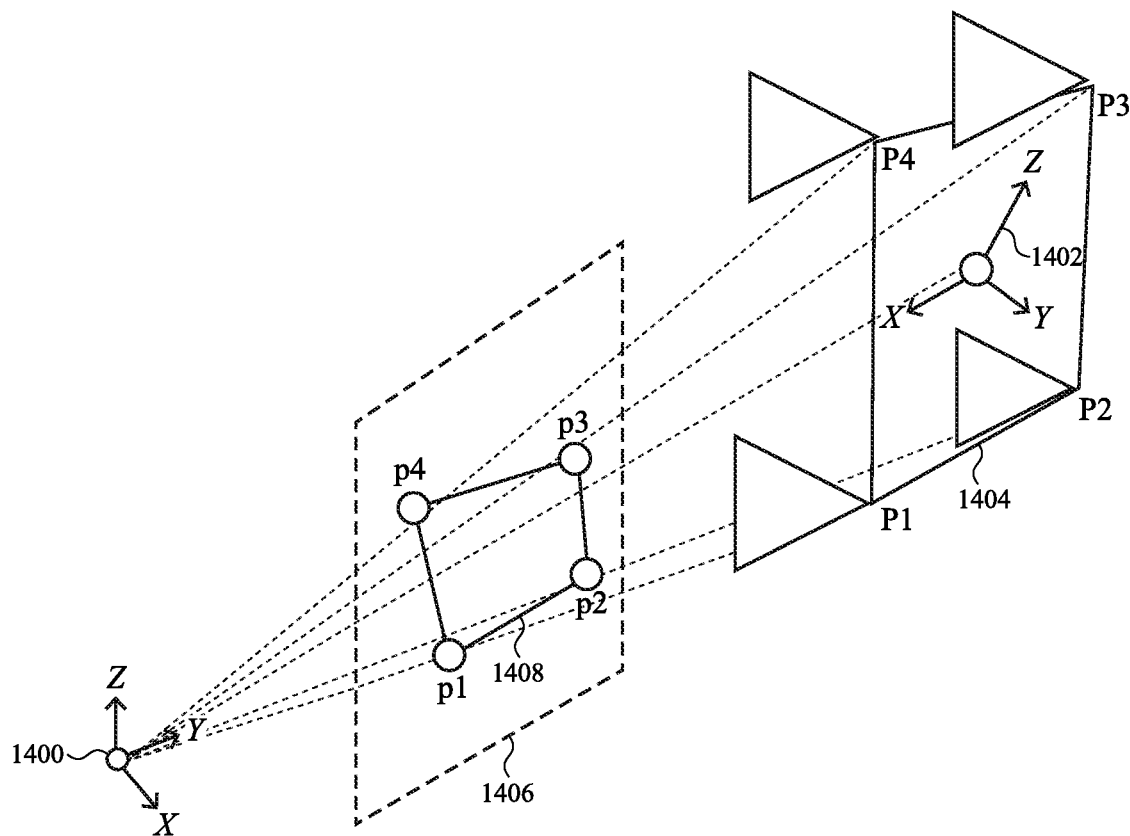
FIG. 14 shows an example relationship between an optical center of a panoramic optical scanner and a two-dimensional (2D) measurement of an optical tracker by the panoramic optical scanner.

FIG. 14 shows an example relationship between an optical center 1400 of a panoramic optical scanner and a 2D measurement 1402 of an optical tracker by the panoramic optical scanner. The timings of electromagnetic radiation edges detected by a set of multiple photodetectors in the optical tracker, and their relation to a timing reference of the panoramic optical scanner, may be used to construct a 2D constellation of coordinates 1404 in a spherical plane (e.g., in a plane defined by an elevation angle (theta) and an azimuth angle (phi)). For example, with a ring-shaped projection pattern, the median timing between leading and trailing edges determines phi, the spacing between the leading and trailing edges. It is possible to resolve the tracking ambiguity across the scanning horizon by shaping the ring-shaped projection pattern asymmetric to the horizon (e.g., in a teardrop shape with respect to theta) or with sensor fusion. The 2D constellation of coordinates 1404 may then be projected onto a virtual (or normalized) image plane 1406 to determine u-v coordinates 1408 in the virtual image plane 1406. A perspective-n-point (PnP) algorithm may then be used to determine tracking coordinates for the six degrees of freedom of the posing 1402 of the optical tracker (e.g., x, y, and z coordinates, and rotation about each of the x, y, and z axes) with respect to the posing 1400 of the panoramic optical scanner.

Figure 15A:
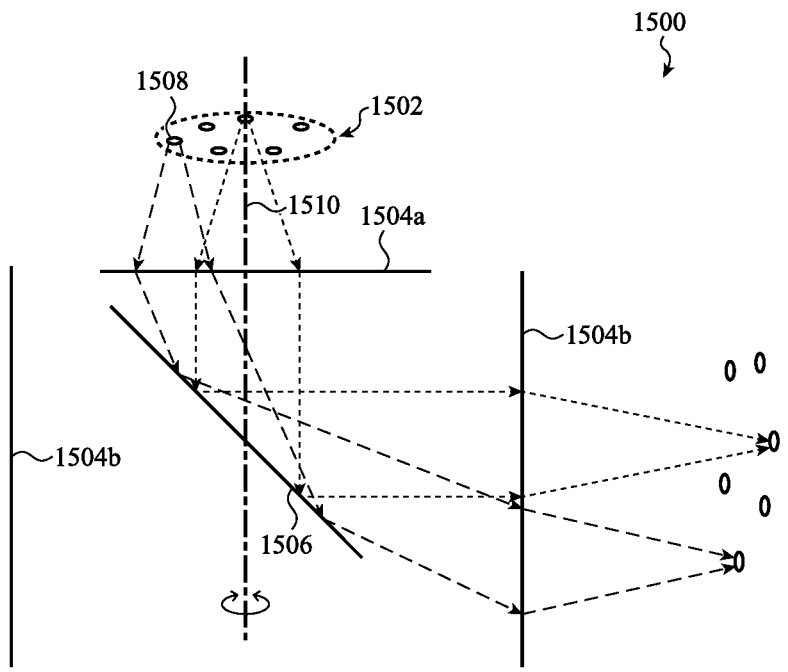
FIGS. 15A-15C show another example of a panoramic optical scanner.
Figure 15B:
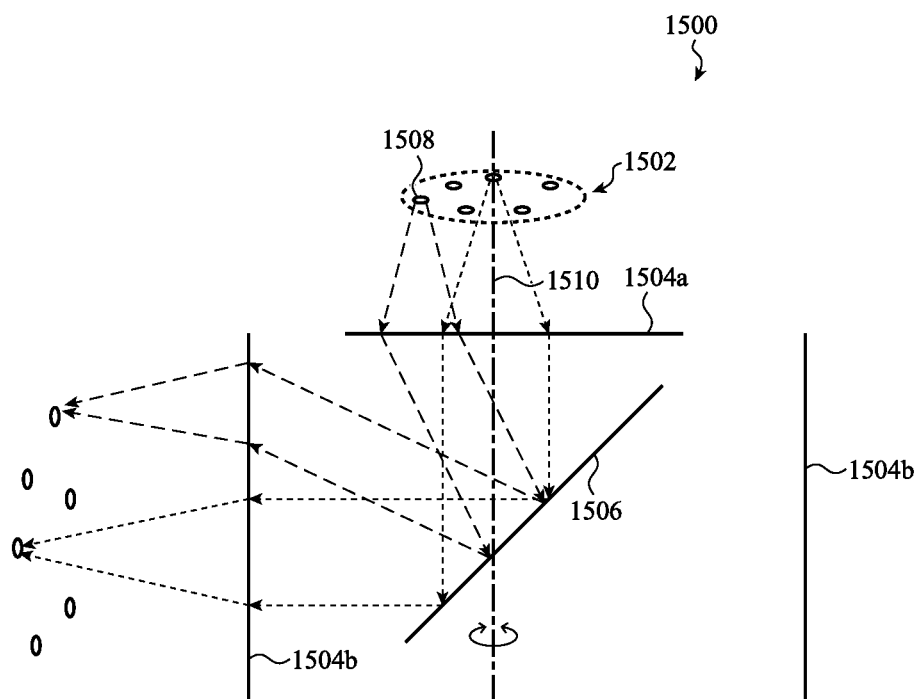
Figure 15C:
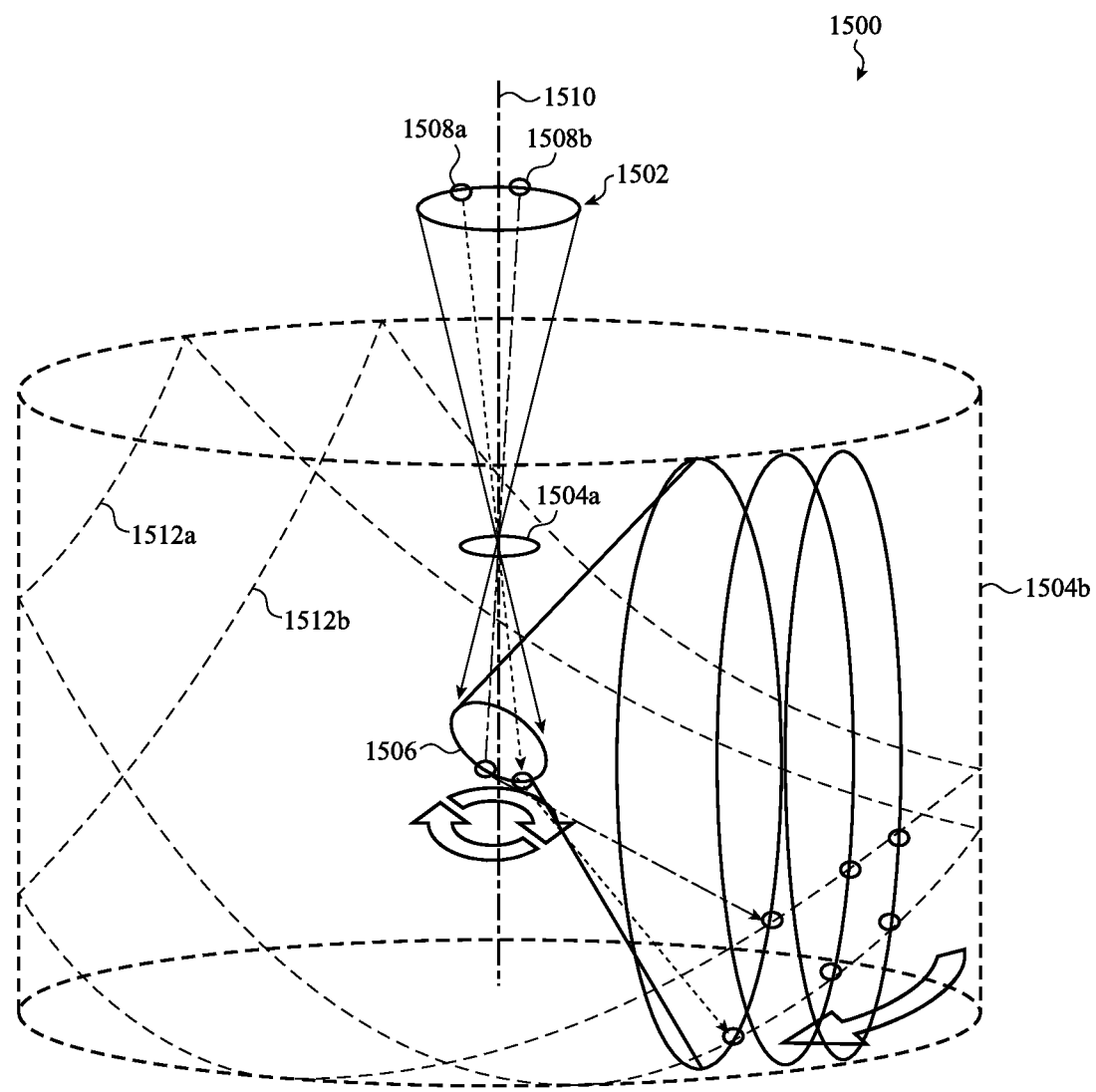

FIGS. 15A-15C show another example of a panoramic optical scanner 1500. The panoramic optical scanner 1500 may include a light source 1502 (or other electromagnetic radiation source), a set of optics 1504 (e.g., lenses 1504a and 1504b), and a light steering assembly including a reflector 1506, as described, for example, with reference to FIGS. 2 & 3A. FIG. 15A shows the reflector 1506 positioned in a first orientation, and FIG. 15B shows the reflector 1506 positioned in a second orientation, opposite the first orientation. FIG. 15C shows an isometric view of the panoramic optical scanner 1500.

The light source 1502 may include a set of light emitters 1508 arranged in circular symmetry about an axis 1510 of the light source 1502. The set of optics 1504 and reflector 1506 may also be disposed about the axis 1510, with the reflector 1506 being disposed about the axis 1510 non-symmetrically.

The light emitters 1508 may be addressed individually or in different combinations by a controller (not shown), with different light emitters 1508 or combinations thereof being activated or deactivated as the reflector 1506 is rotated about an axis 1510.

Light emitted by the light source 1502 may be received and collimated, and directed toward the reflector 1506, by the lens 1504a, as described, for example, with reference to FIG. 4D. Light reflected by the reflector 1506 may be received by a panoramic projection lens 1504b and focused at a distance from the panoramic projection lens 1504b.

When a light emitter 1508 is active (or ON) over an entire rotation of the reflector 1506, the light emitter 1508 projects a cycloid curve 1512 of light into the panoramic field of view. The set of light emitters 1508 may include a sufficient density of light emitters such that all of the cycloid curves (e.g., 1512a, 1512b, and so on) projected by all of the light emitters (e.g., 1502a, 1502b, and so on) cover the entirety of the panoramic field of view (or cover the panoramic field of view at a sufficiently granular resolution, as needed for a particular application).

With the panoramic optical scanner 1500, it is possible to address any 2D spatial position/orientation within a scanning period on demand. In some embodiments, the panoramic optical scanner 1500 may be used to provide private, point-to-point, optical communication links (having a bandwidth twice the optical scanning rate) with one or more devices that include an optical tracker or optical communications interface. In some embodiments, the panoramic optical scanner 1500 may be used as a panoramic display or structured light projector.

In some embodiments, the set of emitters 1508 may be replaced by a set of addressable photodetectors. In these embodiments, the apparatus shown in FIGS. 15A-15C may be used as a panoramic camera. Alternatively, a set of addressable photodetectors may be provided in addition to the set of addressable light emitters 1508. In these embodiments, the apparatus shown in FIGS. 15A-15C may be used for object tracking or as a light detection and ranging (LIDAR) system. For example, the photodetectors may be used to measure times-of-flight of photons emitted by the light emitters 1508.

Figure 16A:
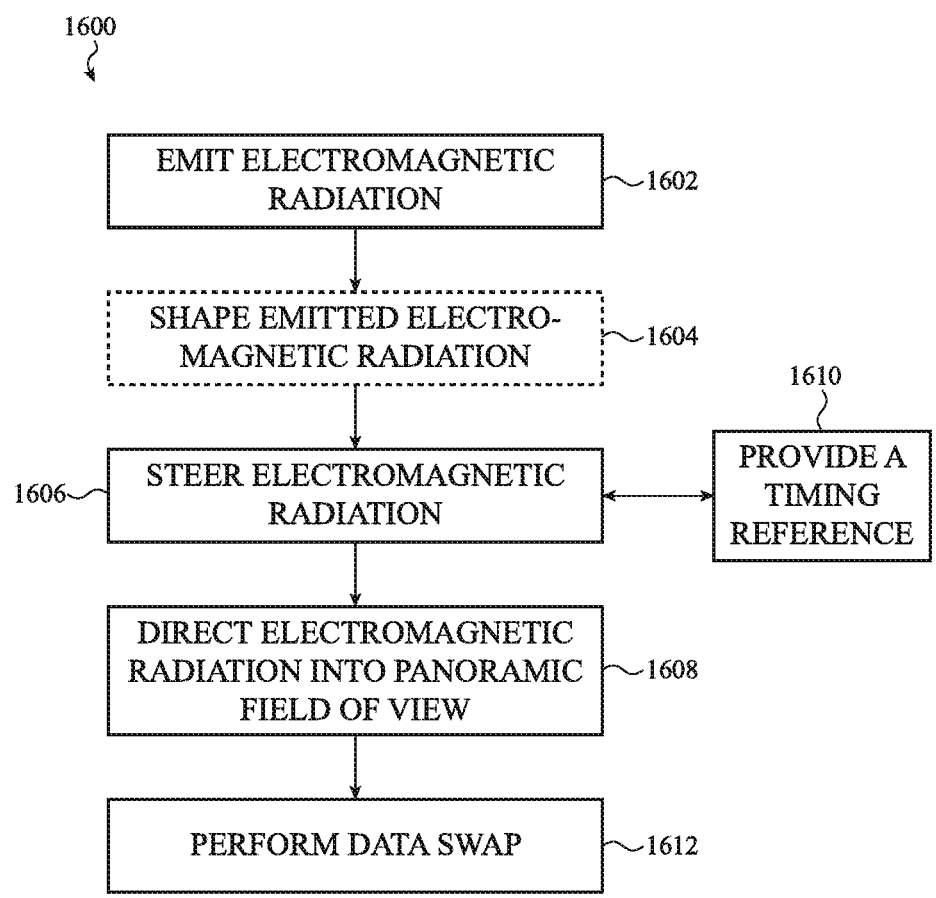
FIGS. 16A-16C show various stages of a process that may be performed by a panoramic optical scanner, an optical tracker, or another device.
Figure 16B:
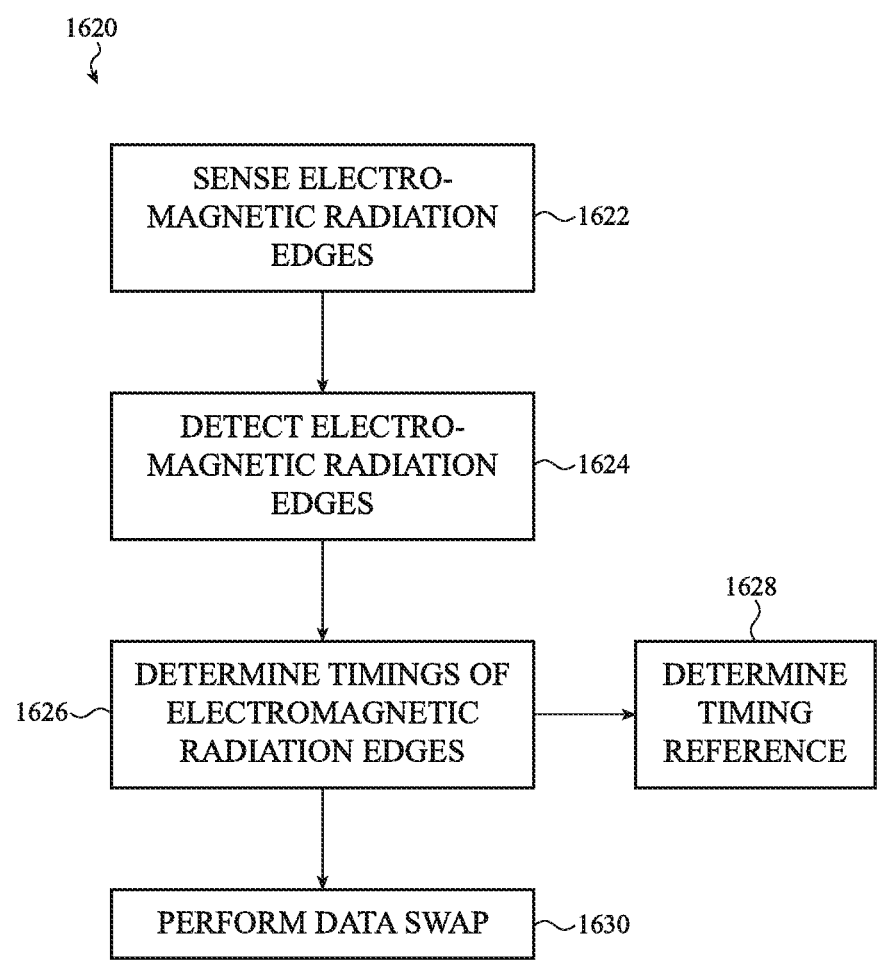
Figure 16C:
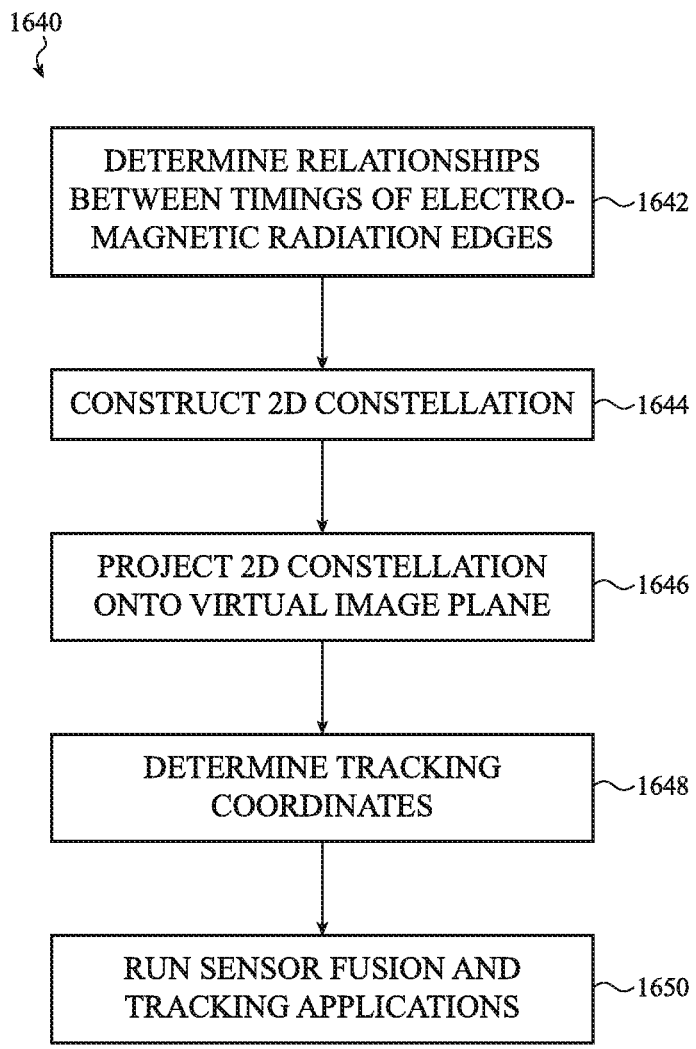

FIGS. 16A-16C show various stages 1600, 1620, 1640 of a process that may be performed by a panoramic optical scanner, an optical tracker, or another device. In particular, FIG. 16A shows a process 1600 that may be performed by a panoramic optical scanner.

At block 1602, the process 1600 may include emitting electromagnetic radiation. The electromagnetic radiation may be emitted by an electromagnetic radiation source, such as the electromagnetic radiation source described with reference to FIG. 2, 3A, or 3B.

At block 1604, the process 1600 may optionally include shaping the electromagnetic radiation. The electromagnetic radiation may be shaped by a set of optics, such as the set of optics described with reference to FIG. 2, 3A, 3B, 4A, 4B, 4C, 4D, 5, or 6.

At block 1606, the process 1600 may include steering the electromagnetic radiation panoramically. The electromagnetic radiation may be steered by an optical component or reflector, such as the optical component or reflector described with reference to FIG. 2, 3A, 3B, 7A, or 7B.

At block 1608, the process 1600 may include directing the electromagnetic radiation reflected by the reflector into a panoramic field of view, and possibly shaping the electromagnetic radiation. The electromagnetic radiation may be directed (and shaped) by a set of optics, such as the set of optics described with reference to FIG. 2, 3A, 3B, 5, or 6. In some embodiments, the shaping performed at block 1604 and the directing performed at block 1608 may be performed using the same set of optics, which may be implemented as a monolithic dielectric as previously described.

At block 1610, and in parallel with the operations performed at blocks 1602-1608, the process 1600 may include providing a timing reference for optical trackers. The timing reference may be synchronized (e.g., phase locked) with the steering operation performed at block 1606. The timing reference may be provided, for example, in any of the ways described with reference to FIGS. 11-13.

At block 1612, the panoramic optical scanner may perform a data swap, in which it transmits information to or receives information from an optical tracker.

FIG. 16B shows a process 1620 that may be performed by an optical tracker.

At block 1622, the process 1620 may include sensing electromagnetic radiation edges swept through a panoramic field of view by a panoramic optical scanner. The electromagnetic radiation edges may be detected by a set of multiple photodetectors, such as the set of multiple photodetectors described with reference to FIG. 8.

At block 1624, the process 1620 may include amplifying and/or filtering charges or signals collected by the photodetectors to detect electromagnetic radiation edges. The amplifying and/or filtering may be performed by a TIA, comparator, and/or other elements of an optical tracker, such as the TIA and comparator described with reference to FIG. 8.

At block 1626, the process 1620 may include determining the timings of the detected electromagnetic radiation edges. The timings may be determined based on the value of a counter, such as the counter described with reference to FIG. 8. The counter may be synchronized to a timing reference received from the panoramic optical scanner.

At block 1628, and in parallel with the operations performed at blocks 1622-1626, the process 1620 may include determining the timing reference of the panoramic optical scanner. In some embodiments, the timing reference may be determined by receiving an optical timing pulse from the panoramic optical scanner, and recording a time of receipt of the optical timing pulse as the timing reference (as described, for example, with reference to FIG. 12). In some embodiments, the timing reference may be determined by 1) determining, from the electromagnetic radiation received from the panoramic optical scanner, a modulation pattern encoded in the electromagnetic radiation, and 2) determining the timing reference from the modulation pattern (as described, for example, with reference to FIG. 12). In some embodiments, the timing reference may be determined by 1) determining, per photodetector and from the collected charges, a width of at least the first edge or the second edge, and 2) determining the timing reference from the width of the first edge or the width of the second edge (as described, for example, with reference to FIG. 13).

At block 1630, the optical tracker may perform a data swap, in which it transmits information to or receives information from the panoramic optical scanner.

FIG. 16C shows a process 1640 that may be performed by a panoramic optical scanner and/or an optical tracker.

At block 1642, the process 1640 may include determining relationships between the timings of detected electromagnetic radiation edges.

At block 1644, the process 1640 may include using the timings of electromagnetic radiation edges and their relationships to construct a 2D constellation of coordinates in a spherical plane (e.g., in a plane defined by an elevation angle (theta) and an azimuth angle (phi)).

At block 1646, the process 1640 may include projecting the 2D constellation onto a virtual image plane to determine u-v coordinates in the virtual image plane.

At block 1648, the process 1640 may include using a perspective-n-point algorithm to determine tracking coordinates for the six degrees of freedom of a posing of the optical tracker (e.g., x, y, and z coordinates, and rotation about each of the x, y, and z axes (e.g., pitch, yaw, and roll)) with respect to the panoramic optical scanner.

At block 1650, the process 1640 may run sensor fusion and tracking applications. For sensor fusion, and in some embodiments, single or multiple time frames of six degree of freedom (DoF) tracking data and its measurement uncertainties/errors derived from previous blocks of the process described with reference to FIGS. 16A-16A and/or obtained from a system memory buffer may be fed into a Kalman filter algorithm (e.g., an Extended Kalman filter, an Unscented Kalman filter, etc.) and fused with single or multiple frames of tracking data and uncertainty/error data from other tracking means, including an IMU, a visual tracking system, etc., to provide higher tracking fidelity, including higher refresh rate, lower latency, higher tracking accuracy, protection against possible tracker photodetector occlusion, etc. For tracking application, a scene to render in an AR, VR, or MR scene may be determined, or a representation of the optical tracker or a posing of the optical tracker in an AR, VR, or MR scene may be determined. Alternatively, the operation(s) at block 1650 may include tuning or transmitting/receiving optical communications between devices including the panoramic optical scanner and the optical tracker, or devices including different optical trackers.

The operations of the process 1640 may be performed by a controller, such as the controller described with reference to FIG. 2 or 8.

Figure 17:
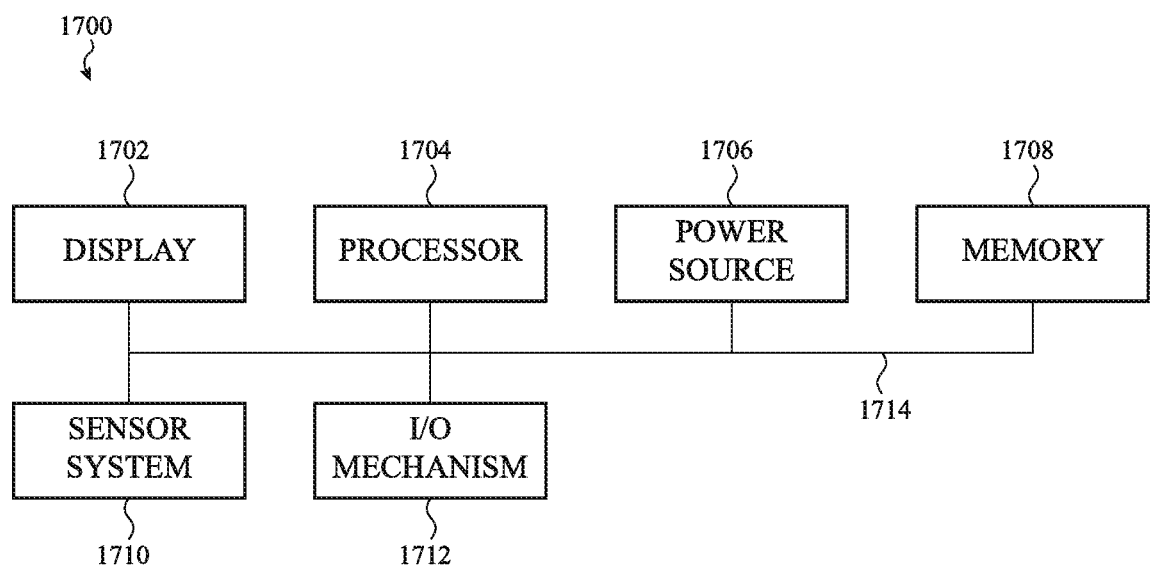
FIG. 17 shows a sample electrical block diagram of an electronic device.

FIG. 17 shows a sample electrical block diagram of an electronic device 1700, which electronic device may in some cases take the form of a panoramic optical scanner or optical tracker described herein. The electronic device 1700 may include a display 1702 (e.g., a light-emitting display), a processor 1704, a power source 1706, a memory 1708 or storage device, a sensor system 1710, or an input/output (I/O) mechanism 1712 (e.g., an input/output device, input/output port, or haptic input/output interface). The processor 1704 may control some or all of the operations of the electronic device 1700. The processor 1704 may communicate, either directly or indirectly, with some or all of the other components of the electronic device 1700. For example, a system bus or other communication mechanism 1714 can provide communication between the display 1702, the processor 1704, the power source 1706, the memory 1708, the sensor system 1710, and the I/O mechanism 1712.

The processor 1704 may be implemented as any electronic device capable of processing, receiving, or transmitting data or instructions, whether such data or instructions is in the form of software or firmware or otherwise encoded. For example, the processor 1704 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some embodiments, the processor 1704 may function as the controller described with reference to FIG. 2 or 8.

It should be noted that the components of the electronic device 1700 can be controlled by multiple processors. For example, select components of the electronic device 1700 (e.g., the sensor system 1710) may be controlled by a first processor and other components of the electronic device 1700 (e.g., the display 1702) may be controlled by a second processor, where the first and second processors may or may not be in communication with each other.

The power source 1706 can be implemented with any device capable of providing energy to the electronic device 1700. For example, the power source 1706 may include one or more batteries or rechargeable batteries. Additionally or alternatively, the power source 1706 may include a power connector or power cord that connects the electronic device 1700 to another power source, such as a wall outlet.

The memory 1708 may store electronic data that can be used by the electronic device 1700. For example, the memory 1708 may store electrical data or content such as, for example, audio and video files, documents and applications, device settings and user preferences, timing signals, control signals, and data structures or databases. The memory 1708 may include any type of memory. By way of example only, the memory 1708 may include random access memory, read-only memory, Flash memory, removable memory, other types of storage elements, or combinations of such memory types.

The electronic device 1700 may also include one or more sensor systems 1710 positioned almost anywhere on the electronic device 1700. The sensor system(s) 1710 may be configured to provide a panoramic optical scanner as described herein, or may sense one or more type of parameters, such as but not limited to, electromagnetic radiation edges; pressure on the display 1702, a crown, a button, or a housing of the electronic device 1700; light; touch; heat; movement; relative motion; biometric data (e.g., biological parameters) of a user; and so on. For example, the sensor system(s) 1710 may include a panoramic optical scanner, an optical tracker, a watch crown sensor system, a heat sensor, a position sensor, a light or optical sensor, an accelerometer, a pressure transducer, a gyroscope, a magnetometer, a health monitoring sensor, and so on. Additionally, the one or more sensor systems 1710 may utilize any suitable sensing technology, including, but not limited to, capacitive, ultrasonic, resistive, optical, ultrasound, piezoelectric, and thermal sensing technology.

The I/O mechanism 1712 may transmit or receive data from a user or another electronic device. The I/O mechanism 1712 may include the display 1702, a touch sensing input surface, a crown, one or more buttons (e.g., a graphical user interface "home" button), one or more cameras, one or more microphones or speakers, one or more ports such as a microphone port, and/or a keyboard. Additionally or alternatively, the I/O mechanism 1712 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A panoramic optical scanner, comprising:
   a light source configured to emit light along an axis;
   a light directing module disposed about the axis and configured to receive and direct the light emitted by the light source; and
   a light steering assembly disposed about the axis and configured to steer light received from the light directing module non-symmetrically about the axis and toward the light directing module; wherein:
   light received at the light directing module from the light steering assembly is directed into a panoramic field of view, in a ring of light having a leading edge and a trailing edge; and
   the ring of light is moved about the axis by the light steering assembly.

2. The panoramic optical scanner of claim 1, further comprising:
   a housing; wherein:
   the light source and the light directing module are mounted in fixed stationary positions within the housing.

3. The panoramic optical scanner of claim 2, wherein the light steering assembly comprises:
   an optical component configured to direct received light non-symmetrically about the axis; and
   a motor configured to rotate the optical component.

4. The panoramic optical scanner of claim 2, wherein the light steering assembly comprises:
   a reflective surface configured to direct received light non-symmetrically about the axis; and
   at least one component configured to move the reflective surface through different non-symmetric orientations with respect to the axis.

5. The panoramic optical scanner of claim 1, wherein the light directing module comprises a monolithic dielectric through which light passes from the light source to the light steering assembly, and from the light steering assembly to the panoramic field of view.

6. An electronic device, comprising:
   an electromagnetic radiation source having an axis;
   a set of optics disposed about the axis;
   a reflector disposed about the axis non-symmetrically; and
   a controller configured to operate the electromagnetic radiation source while changing a beam steering orientation of the reflector; wherein,
   the reflector is disposed to reflect electromagnetic radiation emitted by the electromagnetic radiation source; and
   the set of optics is disposed to,
      shape electromagnetic radiation emitted by the electromagnetic radiation source, before the emitted electromagnetic radiation is reflected by the reflector; and
      direct electromagnetic radiation received from the reflector into a panoramic field of view about the axis, the electromagnetic radiation directed into the panoramic field of view having a pattern or shape including a leading edge and a trailing edge, the trailing edge spatially following the leading edge, and the leading edge and the trailing edge moved about the axis as the controller changes the beam steering orientation of the reflector.

7. The electronic device of claim 6, wherein the electromagnetic radiation source comprises a single electromagnetic radiation emitter.

8. The electronic device of claim 6, wherein the electromagnetic radiation source comprises a set of electromagnetic radiation emitters disposed in circular symmetry about the axis.

9. The electronic device of claim 6, wherein:
the controller is configured to rotate the reflector about the axis; and
the set of optics is configured to change a thickness of the leading edge, or the trailing edge, or a combination thereof as the reflector is rotated about the axis.

10. The electronic device of claim 6, wherein the pattern or shape including the leading edge and the trailing edge defines a ring shape.

11. The electronic device of claim 6, wherein:
the set of optics directs the electromagnetic radiation received from the reflector to one side of the axis; and
the change of the beam steering orientation of the reflector sweeps the electromagnetic radiation around the axis.

12. The electronic device of claim 6, wherein:
the set of optics directs the electromagnetic radiation received from the reflector into a ring about the axis; and
the change of the beam steering orientation of the reflector causes the ring to wobble about the axis.

13. An electronic device, comprising:
an electromagnetic radiation source including a set of electromagnetic radiation emitters disposed in circular symmetry about an axis;
a set of optics disposed about the axis;
a reflector disposed about the axis non-symmetrically; and
a controller configured to operate the electromagnetic radiation source while controlling a beam steering orientation of the reflector; wherein,
the reflector is disposed to reflect electromagnetic radiation emitted by the electromagnetic radiation source;
the set of optics is disposed to,
shape electromagnetic radiation emitted by the electromagnetic radiation source, before the emitted electromagnetic radiation is reflected by the reflector; and
direct electromagnetic radiation received from the reflector into a panoramic field of view about the axis; and
the controller is configured to activate or deactivate different electromagnetic emitters or different combinations of electromagnetic radiation emitters as the reflector is rotated about the axis.

14. An electronic device, comprising:
an electromagnetic radiation source;
a set of optics disposed about the axis;
a reflector disposed about the axis non-symmetrically; and
a controller configured to operate the electromagnetic radiation source while controlling a beam steering orientation of the reflector; wherein,
the reflector is disposed to reflect electromagnetic radiation emitted by the electromagnetic radiation source;
the set of optics is disposed to,
shape electromagnetic radiation emitted by the electromagnetic radiation source, before the emitted electromagnetic radiation is reflected by the reflector; and
direct electromagnetic radiation received from the reflector into a panoramic field of view about the axis; and
the controller is configured to modulate the electromagnetic radiation differently as the reflector is moved through different non-symmetric orientations with respect to the axis.

15. An electronic device, comprising:
a set of multiple photodetectors, each photodetector having a fixed spatial and orientation relationship with respect to other photodetectors in the set of multiple photodetectors;
a controller configured to:
operate each photodetector during each of multiple time periods;
for each photodetector of the set of multiple photodetectors, identify a first timing of a first edge of electromagnetic radiation and a second timing of a second edge of electromagnetic radiation, the electromagnetic radiation received from a panoramic optical scanner; and
relate the first and second timings identified per photodetector to a timing reference of the panoramic optical scanner.

16. The electronic device of claim 15, further comprising:
receiving an optical timing pulse from the panoramic optical scanner; and
recording a time of receipt of the optical timing pulse as the timing reference.

17. The electronic device of claim 15, further comprising:
determining, from the electromagnetic radiation received from the panoramic optical scanner, a modulation pattern encoded in the electromagnetic radiation; and
determining the timing reference from the modulation pattern.

18. The electronic device of claim 15, further comprising:
determining, per photodetector, a width of at least the first edge or the second edge; and
determining the timing reference from the width of the first edge or the width of the second edge.

19. The electronic device of claim 15, further comprising:
receiving an indication of a posing of the panoramic optical scanner; and
determining, based at least in part on the relating of the first and second timings identified per photodetector to the timing reference, the fixed spatial and orientation relationships of the photodetectors, and the posing of the panoramic optical scanner, a posing of the electronic device in relation to the posing of the panoramic optical scanner.

20. The electronic device of claim 15, further comprising:
Transmitting, to the panoramic optical scanner, and for each photodetector of the set of multiple photodetectors, an indication of the first and second timings in relation to the timing reference; and
receiving a response to the indication from the panoramic optical scanner.

* * * * *